(12) United States Patent
Weghaus et al.

(10) Patent No.: US 10,427,644 B2
(45) Date of Patent: Oct. 1, 2019

(54) APPARATUSES, METHODS, AND COMPUTER PROGRAMS FOR ESTABLISHING A RADIO CONNECTION ON THE BASIS OF PROXIMITY INFORMATION

(71) Applicants: VOLKSWAGEN AKTIENGESELLSCHAFT, Wolfsburg (DE); HELLA GMBH & CO. KGAA, Lippstadt (DE)

(72) Inventors: Ludger Weghaus, Lippstadt (DE); Hannes Haupt, Braunschweig (DE)

(73) Assignees: VOLKSWAGEN AKTIENGESELLSCHAFT (DE); HELLA GMBH & CO. KGAA (DE)

( * ) Notice: Subject to any disclaimer, the term of this patent is extended or adjusted under 35 U.S.C. 154(b) by 0 days.

(21) Appl. No.: 15/748,200

(22) PCT Filed: Jul. 26, 2016

(86) PCT No.: PCT/EP2016/067841
§ 371 (c)(1),
(2) Date: Jan. 29, 2018

(87) PCT Pub. No.: WO2017/017114
PCT Pub. Date: Feb. 2, 2017

(65) Prior Publication Data
US 2018/0215347 A1 Aug. 2, 2018

(30) Foreign Application Priority Data
Jul. 29, 2015 (DE) .................. 10 2015 214 336

(51) Int. Cl.
*B60R 25/24* (2013.01)
*B60R 25/102* (2013.01)

(52) U.S. Cl.
CPC .......... *B60R 25/245* (2013.01); *B60R 25/102* (2013.01); *B60R 25/24* (2013.01); *B60R 25/248* (2013.01)

(58) Field of Classification Search
CPC ..... B60R 25/245; B60R 25/102; B60R 25/24; B60R 25/248
See application file for complete search history.

(56) References Cited

U.S. PATENT DOCUMENTS 8,430,310 B1 * 4/2013 Ho .......................... G06F 21/35
235/382
8,983,719 B2 * 3/2015 Ukai ....................... G06F 17/00
701/1

(Continued)

FOREIGN PATENT DOCUMENTS

DE 102012111344 A1 5/2013
WO 2014125353 A1 8/2014

OTHER PUBLICATIONS

Search Report for International Patent Application No. PCT/EP2016/067841, dated Oct. 19, 2016.

*Primary Examiner* — Brian E Miller
(74) *Attorney, Agent, or Firm* — Barnes & Thornburg LLP

(57) ABSTRACT

An apparatus for a vehicle key, an apparatus for a vehicle control system, and an apparatus for a mobile device. The apparatus includes a first interface to communicate with a vehicle control system and a second interface to communicate via a radio connection. The apparatus also includes a control module to receive proximity information from the vehicle control system via the first interface and to establish a radio connection via the second interface if the proximity information indicates spatial proximity of the vehicle key to the vehicle control system.

16 Claims, 14 Drawing Sheets

(56) References Cited

U.S. PATENT DOCUMENTS

| | | | |
|---|---|---|---|
| 9,685,073 B2* | 6/2017 | Lickfelt | G08C 17/02 |
| 9,739,226 B2* | 8/2017 | Elwart | B60K 28/04 |
| 9,875,649 B2* | 1/2018 | King | G08C 17/02 |
| 9,875,650 B2* | 1/2018 | Witkowski | G08C 17/02 |
| 10,075,575 B2* | 9/2018 | Dentamaro | H04M 1/7253 |
| 2003/0186652 A1* | 10/2003 | Hopf | B60R 16/023 |
| | | | 455/41.2 |
| 2011/0257817 A1 | 10/2011 | Tieman | |
| 2013/0137372 A1* | 5/2013 | Nishidai | H04B 5/00 |
| | | | 455/41.1 |
| 2013/0259232 A1 | 10/2013 | Petel | |
| 2014/0313009 A1 | 10/2014 | King et al. | |
| 2015/0379793 A1* | 12/2015 | Murakami | B60R 25/24 |
| | | | 340/5.61 |

* cited by examiner

APPARATUSES, METHODS, AND COMPUTER PROGRAMS FOR ESTABLISHING A RADIO CONNECTION ON THE BASIS OF PROXIMITY INFORMATION

PRIORITY CLAIM

This patent application is a U.S. National Phase of International Patent Application No. PCT/EP2016/067841, filed 26 Jul. 2016, which claims priority to German Patent Application No. 10 2015 214 336.8, filed 29 Jul. 2015, the disclosures of which are incorporated herein by reference in their entireties.

SUMMARY

Exemplary embodiments provide an apparatus for a vehicle key. The apparatus comprises a first interface to communicate with a vehicle control system, a second interface to communicate via a radio connection (in particular, to a mobile device), a control module to receive proximity information from the vehicle control system via the first interface and to establish a radio connection via the second interface if the proximity information indicates spatial proximity of the vehicle key to the vehicle control system.

BRIEF DESCRIPTION OF THE DRAWINGS

Disclosed embodiments are described in more detail below with reference to the drawings, but there is generally no restriction overall to the exemplary embodiments. In the drawings.

DETAILED DESCRIPTION

Figure 1:
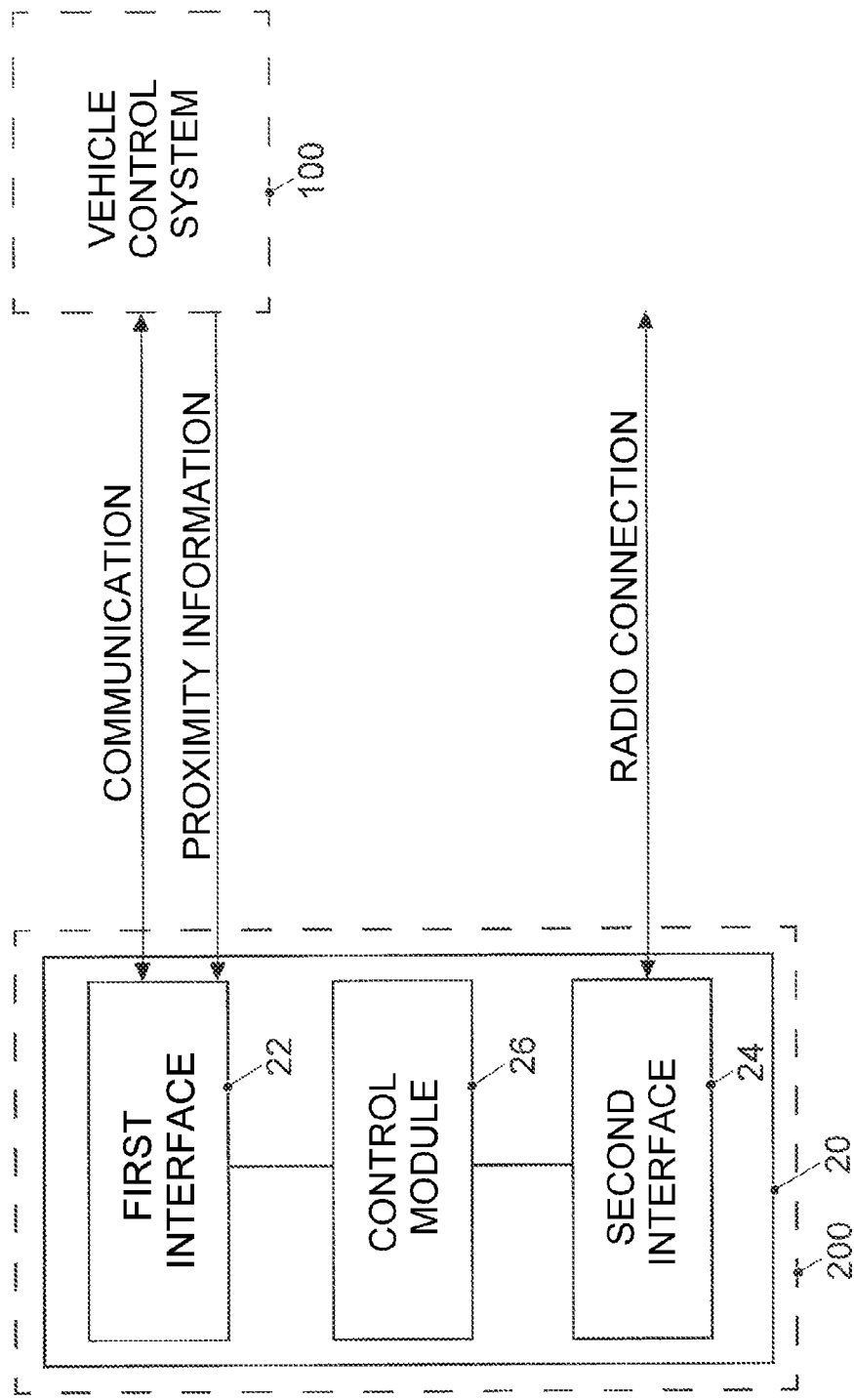
FIG. 1 illustrates a block diagram of an exemplary embodiment of an apparatus for a vehicle key.

The security for the access and driving authorization for a vehicle usually assumes a central role. A large amount of effort is often made to prevent unauthorized access to a vehicle. The same applies to the driving authorization. Vehicle keys often comprise sophisticated security systems to prevent or impede copying of the keys or access to the vehicle or its mobility without a valid key. These security systems may be based, for example, on a transponder which is activated by a magnetic field of an immobilizer system and could transmit an electronic access key to the vehicle.

In addition to conventional access systems, vehicle keys are being developed which can make it possible to access the vehicle without transmission of a key being explicitly activated by a user (so-called keyless entry) or can make it possible to start the vehicle without the vehicle key being inserted into an ignition lock of the vehicle (so-called keyless go). This access may be based, for example, on a radio technology, for example, BLUETOOTH® Low Energy (BTLE). Such short-range radio technologies may also be supported, for example, by mobile devices, for example, by smartphones.

Therefore, there is a need to provide a concept for integrating mobile devices into a security context of a vehicle, which concept makes it possible to improve the security of access to vehicle information and/or vehicle functions by a mobile device. This need is taken into account by an apparatus for a vehicle key (for example, a radio key), an apparatus for a vehicle control system, and an apparatus for a mobile device.

Some exemplary embodiments may make this possible, for example, by pairing or bonding the mobile device to a vehicle key (for example, a radio key), for example, via an access and driving authorization system with a controlled learning operation for mobile terminals. The text below uses the term "pairing" which can comprise, for example, pairing a plurality of devices using a protocol context, interchanging connection and/or encryption information and/or holding common connection parameters in two paired devices. In exemplary embodiments, a vehicle key could be changed to a pairing state, for example, in which a mobile device can start pairing with the vehicle key. This pairing state could depend, for example, on whether the key is inside the vehicle. In exemplary embodiments, the presence of the key could be determined by the vehicle key on the basis of an item of proximity information from a vehicle control system of the vehicle (for example, an item of distance information which indicates how far away the vehicle key is from the vehicle control system and therefore from a vehicle). If the vehicle key is in the vehicle, it could be paired with the mobile device and could allow the mobile device to access functions and/or information relating to the vehicle key and/or the vehicle, for example.

Exemplary embodiments provide an apparatus for a vehicle key. The apparatus comprises a first interface designed to communicate with a vehicle control system. The apparatus also comprises a second interface designed to communicate via a radio connection (in particular, to a mobile device). The apparatus also comprises a control module designed to receive proximity information from the vehicle control system via the first interface. The control module is also designed to establish a radio connection via the second interface if the proximity information indicates spatial proximity of the vehicle key to the vehicle control system. In exemplary embodiments, authentication security can be increased by using the proximity information as a condition for establishing a radio connection. In exemplary embodiments, the radio connection can be authenticated with respect to the vehicle key, the vehicle control system and/or the mobile device by coupling the vehicle key to a mobile device or to the vehicle control system, for example, via a radio connection on the basis of the proximity information. The apparatus may be part of the vehicle key which, in particular, is not the mobile device (for example, a smartphone or a mobile telephone). That is to say, the vehicle key can comprise the apparatus.

In this case, a vehicle key is understood as meaning, in particular, an electronic apparatus which communicates directly with the vehicle control system of the vehicle by radio to activate a vehicle function (for example, locking, unlocking) of the vehicle. The vehicle key does not have any mobile radio functionality for voice transmission, in particular.

In some exemplary embodiments, the process of establishing the radio connection can comprise interchanging radio connection parameters. The control module could also be designed to determine radio connection pairing for the radio connection. In some exemplary embodiments, the interchange of radio connection parameters may be a prerequisite for establishing a radio connection. The determination of radio connection pairing could enable permanent pairing and/or authentication of the vehicle key and of a communication partner.

In some exemplary embodiments, the control module could be designed to establish the radio connection to a mobile device (for example, a smartphone). In some exemplary embodiments, the control module could be designed to establish the radio connection to the vehicle control system. A radio connection between the vehicle key and the mobile device could make it possible to interchange or request information, for example, to make state information relating to the vehicle key or the vehicle accessible to the mobile device or to authenticate the mobile device with respect to the vehicle. A radio connection between the vehicle control system and the vehicle key could make it possible to use short-range radio functions, for example, keyless entry and/or keyless go.

In at least some exemplary embodiments, the control module could be designed to interchange information relating to a device identification (for example, with the mobile device and/or vehicle control system). The information relating to the device identification could comprise device identification information relating to the vehicle key, device identification information relating to the mobile device and/or device identification information relating to the vehicle control system. In at least some exemplary embodiments, the vehicle key, the mobile device and/or the vehicle control system could use the device identification information to set up the radio connection, for example, by releasing a device identification for communication, as a device pairing parameter or as an encryption parameter.

In some exemplary embodiments, the information relating to the device identification could comprise encryption information. The control module could also be designed to establish and/or encrypt the radio connection on the basis of the encryption information. In exemplary embodiments, encryption of the radio connection could increase security of the radio connection.

In some exemplary embodiments, a vehicle could comprise the vehicle control system. The spatial proximity of the vehicle key to the vehicle control system could correspond to a presence of the vehicle key inside the vehicle. A presence of the vehicle key inside the vehicle as a prerequisite of a pairing operation increases the security of the communication processes based thereon. In other words, the radio connection between the vehicle key and the mobile device or the pairing operation between the vehicle key and the mobile device is established or carried out, in particular, only when the vehicle key is simultaneously detected inside the vehicle.

According to another disclosed embodiment, the radio connection between the vehicle key and the mobile device or the pairing operation between the vehicle key and the mobile device is established or carried out only when the vehicle key is simultaneously in the immediate proximity of the mobile device (for example, only when the vehicle key and the mobile device are touching). The immediate proximity to the vehicle key could be detected by the mobile device, for example, on the basis of its RFID functionality by virtue of the mobile device, for example, detecting a presence of a (passive) transponder of the vehicle key on the basis of the RFID functionality. The disclosed embodiment therefore requires the vehicle key and the mobile device to be inside the vehicle.

In at least some exemplary embodiments, the control module could also be designed to receive information relating to a connection trigger. The control module 26 could also be designed to establish the radio connection on the basis of the information relating to the connection trigger. The information relating to the connection trigger and therefore the connection trigger itself could be produced by actuating at least one button of the mobile device. The radio connection could correspond, for example, to a BLUETOOTH® connection, a short-distance connection, a near-field communication connection, NFC, or a short-range radio connection. The information relating to the connection trigger could be used, for example, to initiate a change to the pairing state. The use of BLUETOOTH®, short-distance, NFC and/or short-range radio connections may enable a connection based on established protocols, for instance, to mobile devices from different manufacturers.

Exemplary embodiments also provide an apparatus for a vehicle control system. The apparatus comprises a first interface designed to communicate with a vehicle key. The apparatus also comprises a second interface designed to communicate via a communication connection. The apparatus also comprises a control module designed to receive information relating to a device identification from the vehicle key via the first interface or the second interface. The control module is also designed to communicate via the second interface on the basis of the information relating to the device identification. In at least some exemplary embodiments, the vehicle control system could use the information relating to the device identification to set up the radio connection, for example, by releasing a device identification for communication, as a device pairing parameter or as an encryption parameter, and could therefore increase authentication security, for example.

In some exemplary embodiments, the control module could be designed to determine proximity information on the basis of spatial proximity of the vehicle key to the vehicle control system. The control module could also be designed to provide the vehicle key with the proximity information. In exemplary embodiments, authentication security can be increased by providing the proximity information, for example, as a condition for establishing a radio connection.

In some exemplary embodiments, the information relating to the device identification may comprise device identification information relating to the vehicle key. The control module could be designed, for example, to establish the communication connection to the vehicle key on the basis of the device identification information relating to the vehicle key. A radio connection between the vehicle control system and the vehicle key could make it possible to use short-range radio functions, for example, keyless entry and/or keyless go. The security of the radio connection could be increased on the basis of the device identification information relating to the vehicle key, for example.

In some exemplary embodiments, the information relating to the device identification could comprise device identification information relating to a mobile device. The control module could be designed to establish the communication connection to the mobile device on the basis of the device identification information relating to the mobile device. A radio connection between the vehicle control system and the mobile device could make it possible for the mobile device to request vehicle information and access vehicle functions. The security of the radio connection could be increased on the basis of the device identification information relating to the mobile device.

In at least some exemplary embodiments, the information relating to the device identification could comprise encryption information. The control module could also be designed to establish and/or encrypt the communication connection on the basis of the encryption information. In exemplary embodiments, encryption of the communication connection could increase security of the communication connection.

In at least some exemplary embodiments, the communication connection could correspond to a radio connection, a short-distance connection, a short-range radio connection or a wired connection. The use of BLUETOOTH®, short-distance, NFC, short-range radio connections and/or wired connections may enable a connection based on established protocols, for instance, to mobile devices from different manufacturers.

Exemplary embodiments also provide an apparatus for a mobile device. The apparatus comprises an interface designed to communicate via a radio connection. The apparatus also comprises a control module designed to establish a radio connection to a vehicle key via the interface. The control module is also designed to determine radio connection pairing for the radio connection between the vehicle key and the mobile device. A radio connection between the vehicle key and the mobile device could make it possible to interchange or request information, for example, to make state information relating to the vehicle key or the vehicle accessible to the mobile device or to authenticate the mobile device with respect to the vehicle.

In some exemplary embodiments, the control module could also be designed to interchange information relating to a device identification with the vehicle key via the radio connection. In at least some exemplary embodiments, the information relating to the device identification could be used to set up a radio connection, for example, by releasing a device identification for communication, as a device pairing parameter or as an encryption parameter, and could therefore increase authentication security, for example.

In some exemplary embodiments, the information relating to the device identification could comprise device identification information relating to a vehicle control system, device identification information relating to the vehicle key and/or device identification information relating to the mobile device. The control module could be designed to establish a further radio connection to a vehicle control system on the basis of the information relating to the device identification. A radio connection between the vehicle control system and the mobile device could make it possible for the mobile device to request vehicle information and access vehicle functions. The security of the radio connection could be increased on the basis of the device identification information relating to the mobile device.

In at least some exemplary embodiments, the information relating to the device identification could comprise encryption information. The control module could also be designed to establish and/or encrypt the radio connection and/or the further radio connection on the basis of the encryption information. Encryption of the radio connection could increase security of the radio connection in exemplary embodiments.

In at least some exemplary embodiments, the radio connection could correspond to a BLUETOOTH® connection, a short-distance connection, a near-field communication connection, NFC, or a short-range radio connection. The use of BLUETOOTH®, short-distance, NFC and/or short-range radio connections may enable a connection based on established protocols, for instance, to mobile devices from different manufacturers.

Exemplary embodiments also provide a method for a vehicle key. The method comprises communicating with a vehicle control system via a first interface, in particular, of the vehicle key. The method also comprises communicating via a radio connection via a second interface, in particular, of the vehicle key. The method also comprises receiving proximity information from the vehicle control system. The method also comprises establishing a radio connection via the second interface if the proximity information indicates spatial proximity of the vehicle key to the vehicle control system.

Exemplary embodiments also provide a method for a vehicle control system. The method comprises communicating with a vehicle key via a first interface, in particular, of the vehicle control system. The method also comprises communicating via a communication connection via a second interface, in particular, of the vehicle control system. The method also comprises receiving information relating to a device identification from the vehicle key via the first interface or the second interface. The method also comprises communicating via the second interface on the basis of the information relating to the device identification.

Exemplary embodiments also provide a method for a mobile device. The method comprises communicating via a radio connection. The method also comprises establishing a radio connection to a vehicle key. The method also comprises determining radio connection pairing for the radio connection between the vehicle key and the mobile device.

Another exemplary embodiment is a computer program for carrying out at least one of the methods described above when the computer program runs on a computer, a processor or a programmable hardware component. Another exemplary embodiment is also a digital storage medium which is machine-readable or computer-readable and has electronically readable control signals which can interact with a programmable hardware component in such a manner that one of the methods described above is carried out.

Disclosed embodiments also provide a system which comprises a disclosed apparatus for a vehicle key and a disclosed apparatus for a vehicle control system.

Disclosed embodiments provide a further system which comprises a disclosed apparatus for a vehicle key, a disclosed apparatus for a vehicle control system and a disclosed apparatus for a mobile device.

Different exemplary embodiments are now described in more detail with reference to the accompanying drawings in which some exemplary embodiments are illustrated. In the figures, the thickness dimensions of lines, layers and/or regions may be illustrated in an exaggerated form for the sake of clarity.

In the following description of the enclosed figures which show only some exemplary embodiments, identical reference symbols may denote identical or comparable components. Collective reference symbols may also be used for components and objects which occur repeatedly in an exemplary embodiment or in a drawing but are described together with regard to one or more features. Components or objects which are described with identical or collective reference symbols may be identical with respect to individual features, a plurality of features or all features, for example, their dimensions, but may possibly also be designed differently, unless explicitly or implicitly indicated otherwise in the description.

Although exemplary embodiments can be modified and altered in various ways, exemplary embodiments are illustrated in the figures as examples and are described in detail herein. However, it should be clarified that there is no intention to restrict exemplary embodiments to the forms disclosed in each case, but rather exemplary embodiments are intended to cover all functional and/or structural modifications, equivalents and alternatives within the scope of the disclosure. In the entire description of the figures, identical reference symbols denote identical or similar elements.

It should be noted that an element which is referred to as being "connected" or "coupled" to another element can be directly connected or coupled to the other element or elements may be present in between. In contrast, if an element is referred to as being "directly connected" or "directly coupled" to another element, there are no elements present in between. Other terms which are used to describe the relationship between elements should be interpreted in a similar manner (for example, "between" in comparison with "directly in between", "adjacent" in comparison with "directly adjacent" etc.).

The terminology used herein serves only to describe exemplary embodiments and is not intended to restrict the exemplary embodiments. As used herein, the singular forms "a(n)" and "the" are also intended to include the plural forms, unless clearly indicated otherwise by the context. Furthermore, it should be clarified that the expressions such as "contains", "containing", "has", "comprises", "comprising" and/or "having", as used herein, indicate the presence of stated features, whole numbers, operations, work sequences, elements and/or components, but do not rule out the presence or the addition of one or more features, whole numbers, operations, work sequences, elements, components and/or groups thereof.

Unless defined otherwise, all terms used herein (including technical and scientific terms) have the same meaning that is ascribed to them by a person of average skill in the art in the field to which the exemplary embodiments belong. Furthermore, it should be clarified that expressions, for example, those defined in generally used dictionaries, should be interpreted as if they had the meaning that is consistent with their meaning in the context of the relevant art, and should not be interpreted in an idealized or excessively formal sense, as long as this is not expressly defined herein.

There is a continuous, increasing spread of mobile devices, for example, smartphones. The prevalence of mobile devices may be a great potential for using innovative vehicle functions via interfaces suitable for this purpose, for example. In this case, there may be several possible ways of integrating a mobile device into the security context of the vehicle. There is an increasing need to provide mobile telephones belonging to users with the ability to interchange data with the radio key and/or the motor vehicle. At least some exemplary embodiments could safeguard this interchange in a user-friendly manner to the effect that the interchange is available to authorized persons and mobile terminals belonging to other persons can be excluded.

In conventional systems, mobile terminals have often been hitherto incorporated in communication structures of a vehicle in such a manner that the vehicle manufacturer provides the user with access data which must be used by the user to register with the vehicle manufacturer using his mobile device. This is often carried out by communicating a PIN. This may signify a large amount of logistical effort, for example, and is possibly not very convenient. The security in such approaches is partially also limited.

At least some exemplary embodiments may make it possible to use mobile terminals in the automotive context. To increase the security, any desired smartphone could not communicate with the vehicle key or with the vehicle in some exemplary embodiments. On the other hand, an authorized vehicle owner could use any desired mobile telephones, for example. In some exemplary embodiments, a vehicle owner could keep an overview of authorized mobile devices. Exemplary embodiments may provide, for example, an intuitive learning operation for mobile terminals belonging to a user, in which case it could be checked that this learning operation takes place inside the vehicle and/or that the person wishing to carry out the learning operation has a driving authorization. Some exemplary embodiments could ensure that a potential attacker must have physical possession of a valid radio key to carry out this operation. Third-party mobile telephones could be locked out, for example, and security and privacy of a user could be safeguarded. Exemplary embodiments could reduce an outlay by the vehicle manufacturer and could enable a higher degree of flexibility of the user.

Figure 2:
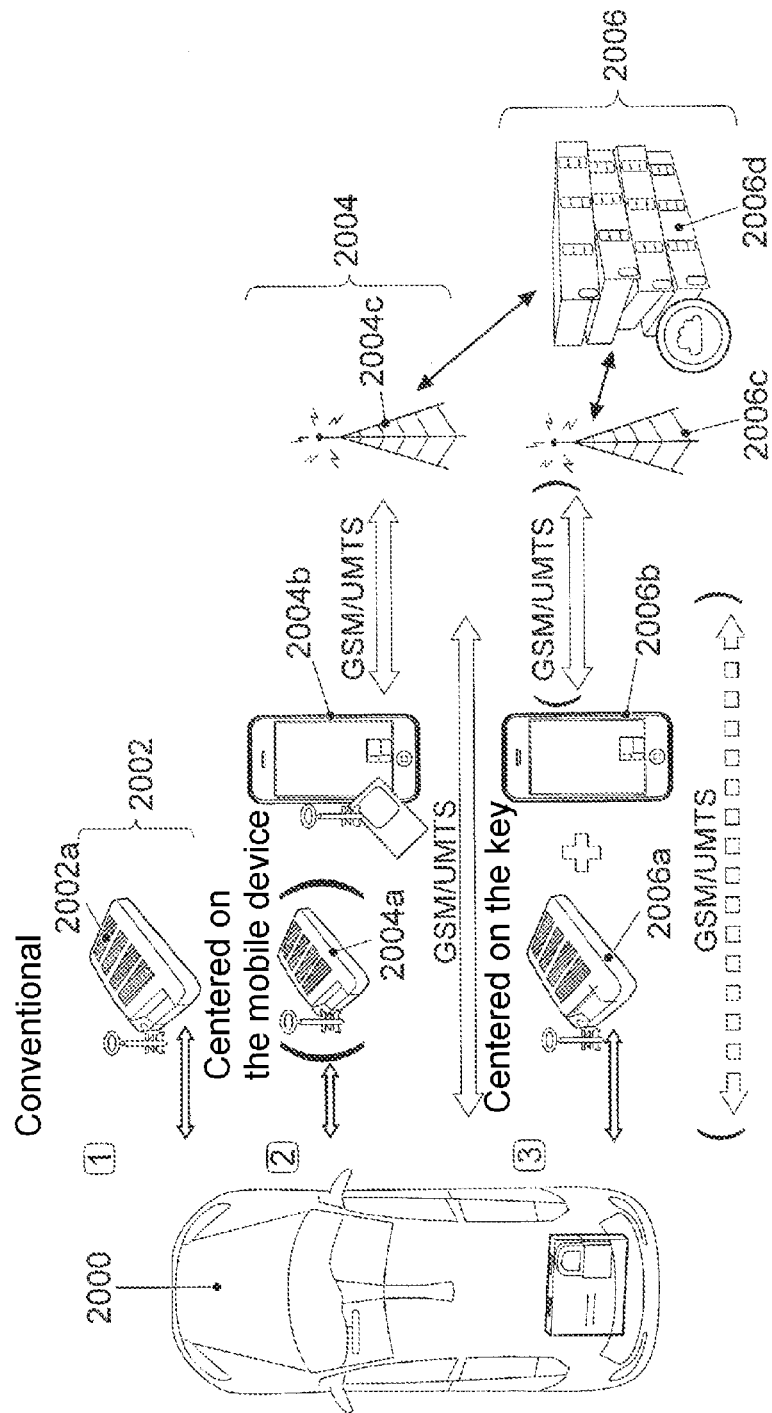
FIG. 2 shows an overview of a plurality of possibilities for an extended vehicle security context of a vehicle.

FIG. 2 shows an overview of a plurality of possibilities for an (extended) vehicle security context of a vehicle. 2002 shows a conventional vehicle security context, in which case a vehicle key 2002a (also called UID, User IDentification, in this application) exists in the vehicle security context of a vehicle 2000. 2004 shows an extended security concept, in which case the vehicle security context comprises a mobile device 2004b and optionally a vehicle key 2004a. The vehicle key 2004a is optionally directly coupled to the vehicle 2000, and the mobile device 2004b is coupled to the vehicle via a base station 2004c and via a mobile communication network, for example, via a Global System for Mobile Communications (GSM), a Universal Mobile Telecommunication System (UMTS), a Long Term Evolution (LTE) communication network or via a fifth generation mobile communication network. 2006 shows a further extended security concept of exemplary embodiments, in which case the vehicle security context comprises a vehicle key 2006a and a mobile device 2006b, the mobile device 2006b being coupled to the vehicle key 2006a. The mobile device is optionally directly coupled to the vehicle 2000 and/or is optionally coupled to the vehicle via an optional base station 2006c and a mobile communication network and/or is coupled to an optional server module 2006d via the base station 2006c.

Figure 2A:
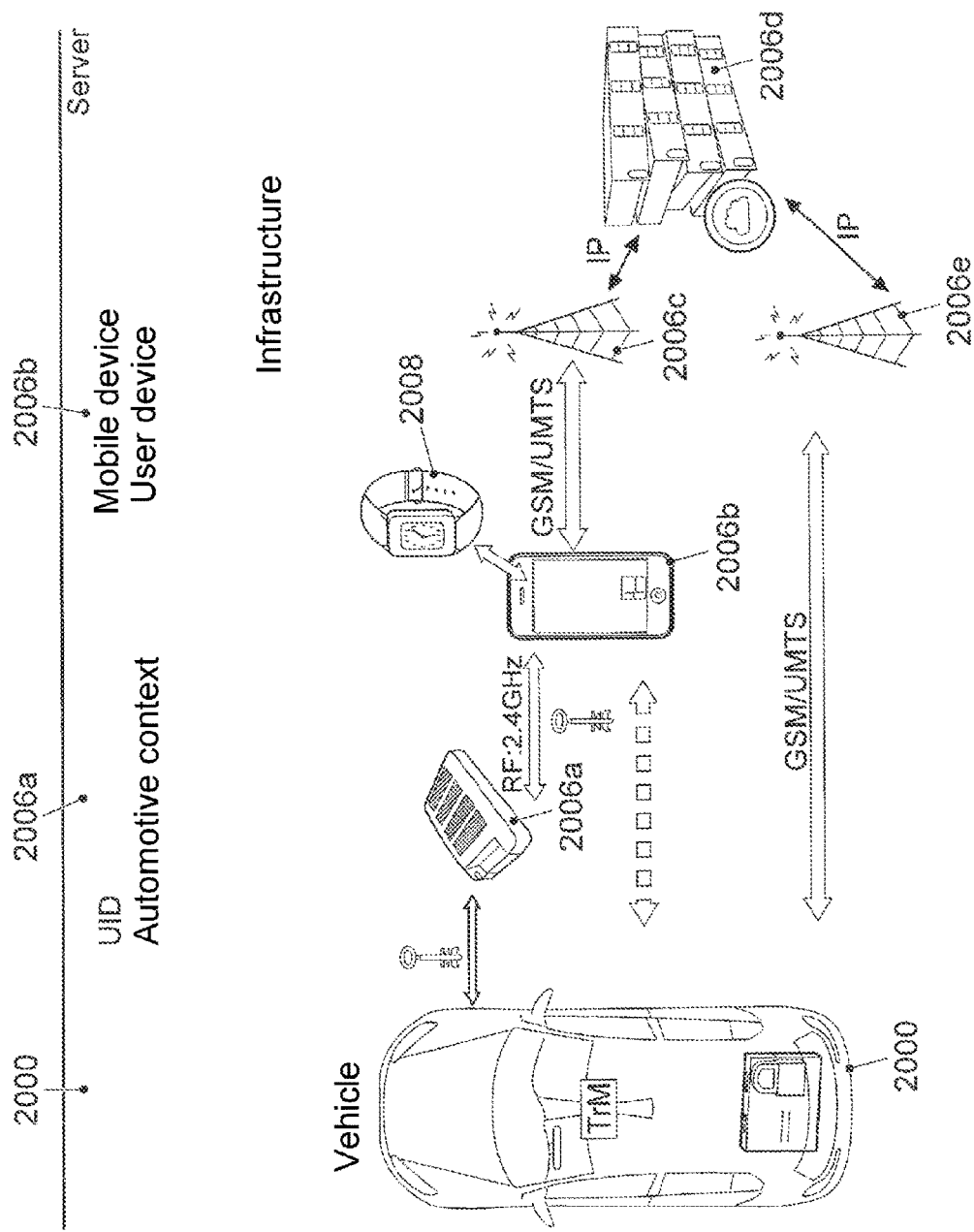
FIG. 2a shows a further overview of an extended vehicle security context of a vehicle.

FIG. 2a shows a further overview of the exemplary embodiment. The vehicle is, for example, directly coupled to the vehicle key 2006a. The mobile device 2006b is coupled to the vehicle key 2006a via a radio-frequency (RF) network, for example, and is coupled to the base station 2006c via the mobile communication network. The mobile device 2006b may be optionally coupled to a smartwatch 2008, for example. The mobile device 2006b may also be optionally directly coupled to the vehicle 2000. The base station 2006c is coupled to the server module 2006d which may be coupled to the vehicle 2000 via a further base station 2006e and the mobile communication network, for example.

In the further description, the vehicle key 2006a may correspond to a vehicle key 200, the vehicle 2000 may correspond to a vehicle 1000 and/or the mobile device 2006b may correspond to a mobile device 300.

Figure 3:
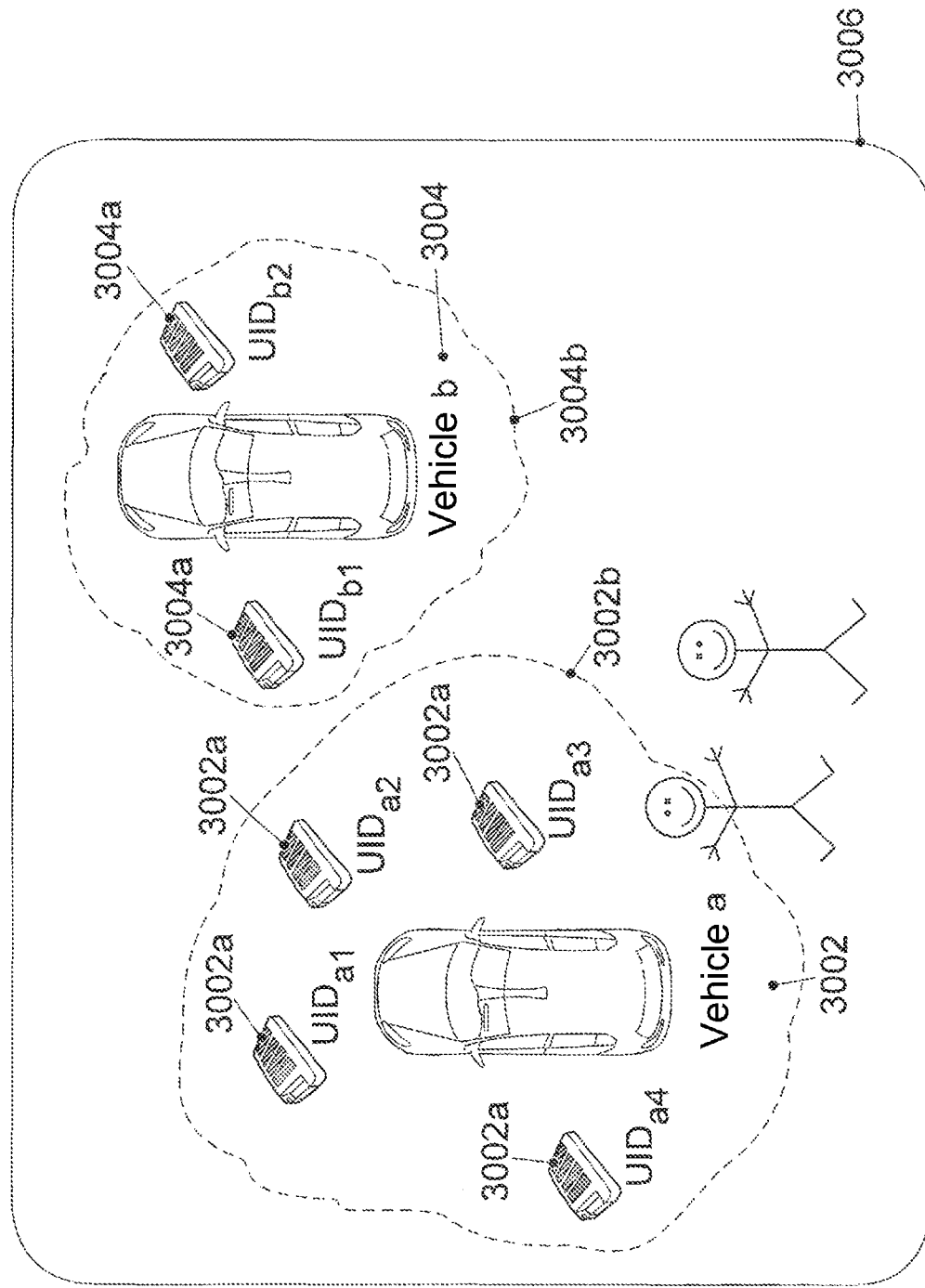
FIG. 3 shows an overview of a conventional vehicle security context of two vehicles.

FIG. 3 shows an overview of a conventional vehicle security context of two vehicles a 3002 and b 3004. Vehicle a 3002 comprises vehicle keys (UID) a1 to a4 3002a in its vehicle security context 3002b. Vehicle b 3004 comprises vehicle keys (UID) b1 and b2 3004a in its vehicle security context 3004b. The two vehicle security contexts 3002b and 3004b are included in an automotive context 3006.

Figure 3A:
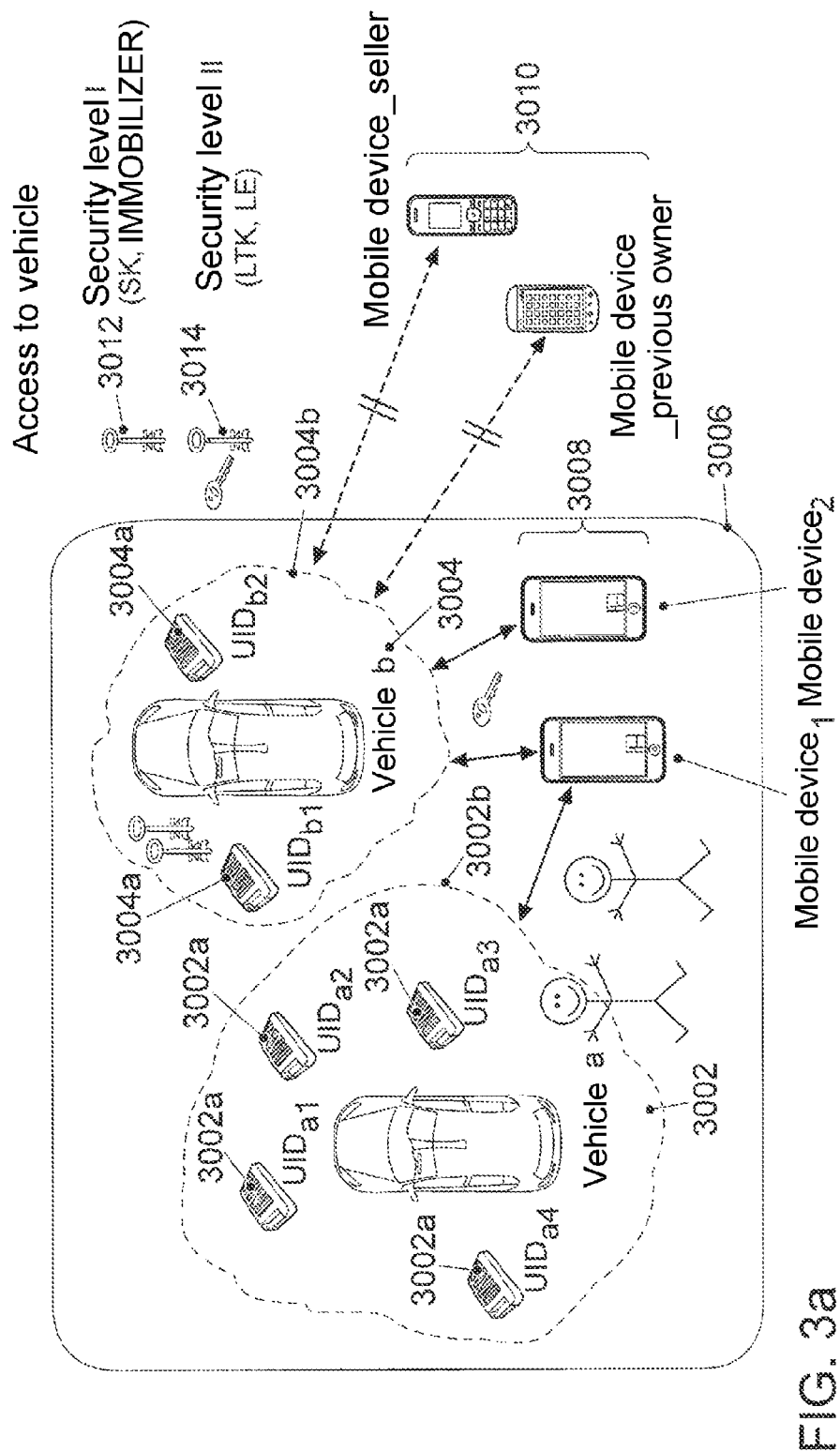
FIG. 3a shows an overview of a vehicle security context of two vehicles and mobile devices.

In addition to the elements from FIG. 3, FIG. 3a shows two mobile devices 3008 within the automotive context 3006 and two mobile devices 3010 mobile device_previous owner and mobile device_seller. The vehicle keys 3002a and 3004a have access to the vehicle within a first security level 3012, for example, on the basis of a secret key (SK) and/or an immobilizer. The vehicle keys 3002a and/or 3004a could correspond to a vehicle key 200 from FIG. 1, for example. The mobile devices 3008 could correspond to mobile devices 300 from FIG. 7, for example. The mobile devices 3008 within the automotive context 3006 have a protected connection to one or both of the vehicles within a second security level 3014, for example, on the basis of a long-term key (LTK) and/or on the basis of a short-range radio connection, for example, based on BLUETOOTH® Low Energy (BTLE or LE. BLUETOOTH® can be abbreviated to BT, for example). The mobile devices outside the automotive context 3006, for instance, the mobile device belonging to the previous owner, mobile device_previous owner, or the mobile device belonging to the seller, mobile device_seller, do not have any connections (and therefore no common keys) to the vehicles 3002 and 3004.

In exemplary embodiments, security may be composed of various facets:
Authorization
  Allocation of a permit to do something or to have access to something
    Provide something (for example, share a key. If shared secrets can be kept, the devices can be connected (also bonded or paired (the terms are used here equivalently)))
Authentication
  Process to verify that someone/something is authorized
    Have/know something (for example, a key)
Confidentiality
  Intention to keep contents secret
    Use encryption (for example, an advanced encryption standard, AES)
Integrity/intactness
  No corruption of transmitted data
    Message authentication
Privacy/data protection
  Intention to preserve anonymity
    Keeping meta data (for example, location data) non-public, for example, by changing addresses.

Figure 4A:
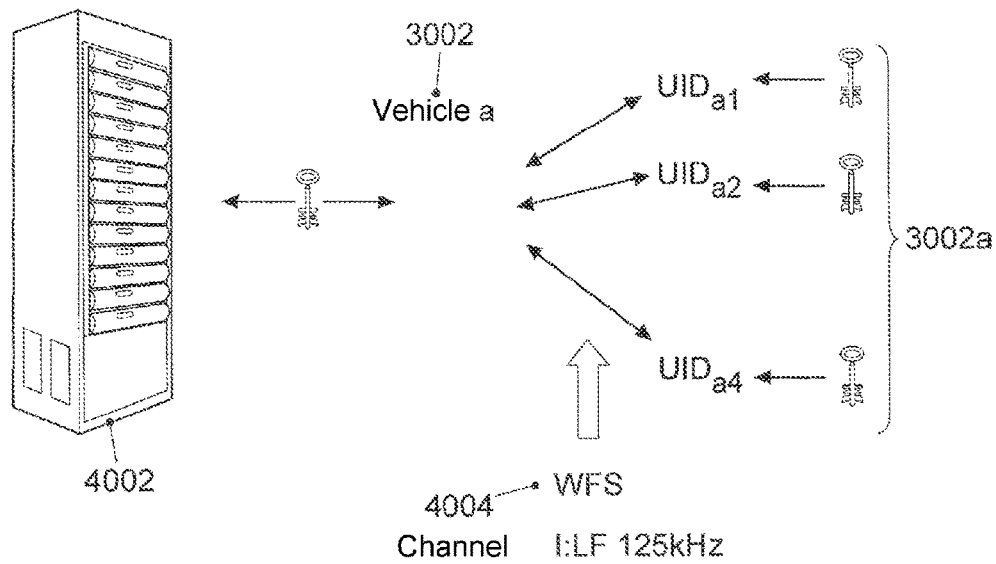
FIG. 4a shows an overview of a process of bonding vehicle keys to a vehicle.

FIG. 4a shows an overview of a process of bonding vehicle keys (UID) 3002 to a vehicle 3002. The bonding process may take place, for example, at the end of manufacture with a vehicle manufacturer or in a workshop belonging to the vehicle manufacturer. The bonding process may presuppose, for example, a connection to a server 4002 belonging to the vehicle manufacturer, which server manages the authorizations, for example. The authorization can be checked in the vehicle, for example, by an immobilizer system 4004 of the vehicle, for example, via a low-frequency (LF) channel. In this case, an SK of the vehicle key can be bonded to an SK of the vehicle, for example. In this case, an SK may correspond to a secret key which can be used to authenticate the vehicle key with respect to the vehicle. In the case of symmetrical encryption methods, the vehicle and the vehicle key (UID) receive the identical SK.

Figure 4B:
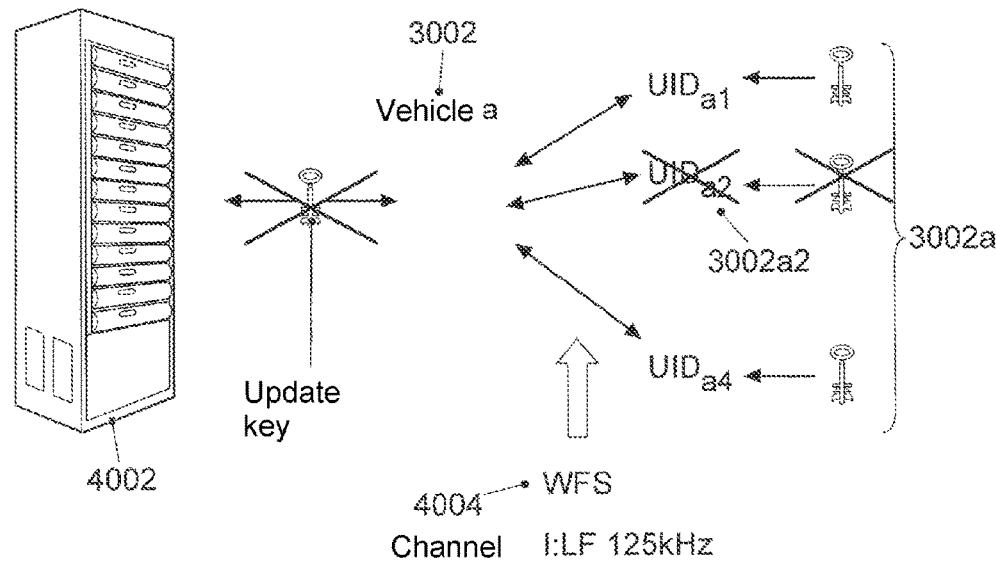
FIG. 4b shows an exemplary embodiment of a process of bonding a vehicle key.

FIG. 4b shows an exemplary embodiment of a process of bonding a vehicle key 3002a to the vehicle 3002a2 from FIG. 4a. This can again take place in a workshop belonging to the vehicle manufacturer and can presuppose a connection to the server 4002 belonging to the vehicle manufacturer. If the key 3002a2 is lost, the relevant SK could be deauthorized, for example, if it cannot be deleted. The relevant update of the keys could take place both in the vehicle 3002 and in the keys 3002a, for example. The server 4002 belonging to the vehicle manufacturer could manage and track the authorizations.

Figure 5:
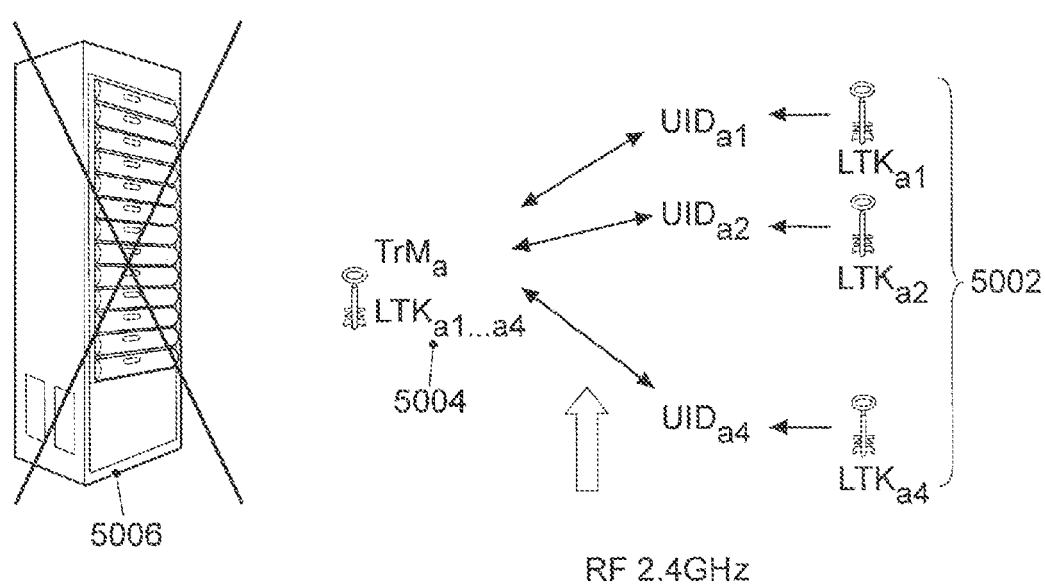
FIG. 5 shows an exemplary embodiment of a process of establishing a communication connection between at least one vehicle key and a transceiver module.

FIG. 5 shows an exemplary embodiment of a process of establishing a communication connection between at least one vehicle key 5002 (which could correspond to a vehicle key 200 from FIG. 1, for example) and a transceiver module (TrM 5004) which could correspond to a vehicle control system 100 from FIG. 1, for example. The communication connection could correspond, for example, to a radio connection, for example, based on a 2.4 GHz communication band or by out-of-band (OOB) communication, for instance, using a BLUETOOTH® OOB mechanism. In some exemplary embodiments, a server 5006 belonging to the vehicle manufacturer might not be involved in this case. The process of establishing the communication connection (the process ensures that the vehicle and the UID have a matching or identical key pair) between the at least one vehicle key 5002 and the TrM 5004 could take place, for example, at the end of manufacture or in a workshop belonging to the vehicle manufacturer. The communication connection could be established, for example, without an existing immobilizer system being involved. In some exemplary embodiments, the TrM 5004 could be replaced by a workshop. In at least some exemplary embodiments, the process of establishing the communication connection could be based on at least one long-term key (LTK), for example, by a key exchange, for instance, a Diffie-Hellman key exchange. The communication connection could be established, for example, during a pairing state or learning operation. In at least some exemplary embodiments, the terms "pairing state", "learning operation" and "learning process" can be used synonymously, for example.

FIG. 1 illustrates a block diagram of an exemplary embodiment of an apparatus 20 for a vehicle key 200. The apparatus 20 comprises a first interface 22 designed to communicate with a vehicle control system 100. In exemplary embodiments, the first interface 22 could correspond to an interface of an immobilizer, for example. The first interface 22 could correspond to a unidirectional communication connection, for example. The first interface 22 could be based, for example, on a computer chip which is excited, for example, via a magnetic field, for example, a radio-frequency identification chip (RFID). Communication with the vehicle control system could correspond to wireless or wired communication, for example. Communication with the vehicle control system could correspond to receiving and/or measuring a magnetic field, for example, and/or communication with the vehicle control system could correspond to determining activation of a computer chip by a magnetic field.

In exemplary embodiments, the vehicle key 200 may correspond to a key (for instance, an ignition key) of a vehicle, which key comprises, for example, a physical key component (for example, a key bit) and/or an electronic key component. The physical key component could be used, for example, as a transmission medium to transmit signals from the electronic key component. The electronic key component could correspond, for example, to a microchip and/or a programmable hardware component which is designed to provide an electronic key, for example, a secret key (also secure key, SK). The electronic key component may be designed to provide the vehicle control system 100 with the secret key or a processed secret key, for example, via a wired or wireless communication connection.

The vehicle control system 100 could correspond, for example, to an on-board unit (OBU) of a vehicle or could be included in an OBU of the vehicle. The vehicle control system 100 could correspond, for example, to a transceiver module (TrM) or could comprise a transceiver module, for example, a first interface 12 and/or a second interface 14 of an apparatus 10 for the vehicle control system. The vehicle control system 100 could be designed, for example, to check key signals, for example, from the vehicle key 200 and/or from a mobile device 300, and to grant a user of the vehicle key 200 and/or of the mobile device 300 access to vehicle functions on the basis of the key signal.

The apparatus 20 also comprises a second interface 24 designed to communicate via a radio connection. In some exemplary embodiments, the radio connection could correspond, for example, to a BLUETOOTH® connection, a short-distance connection, a near-field communication connection (NFC) or a short-range radio connection. The radio connection could correspond, for example, to a wireless local area network (WLAN), for example, according to the IEEE (Institute of Electrical and Electronics Engineers) 802.11 standard.

The first interface 22 and/or the second interface 24 may correspond, for example, to one or more inputs and/or one or more outputs for receiving and/or transmitting information, for instance, in digital bit values, analog signals, magnetic fields, on the basis of a code, inside a module, between modules or between modules belonging to different entities.

The apparatus 20 also comprises a control module 26. The control module 26 is designed to receive proximity information from the vehicle control system 100 via the first interface 22. In at least some exemplary embodiments, the proximity information may correspond to a bit value and/or a bit string. In some exemplary embodiments, the proximity information could correspond, for example, to a measured magnetic field, a strength of a measured magnetic field, an item of information which has been modulated onto a magnetic field and/or activation of a computer chip by a magnetic field. In at least some exemplary embodiments, the proximity information could correspond, for example, to a measured vibration of a vehicle in the operating state. In some further exemplary embodiments, the proximity information could correspond, for example, to received radio signals, for example, above a predefined reception strength, and/or to a received radio communication network.

The control module 26 is also designed to establish a radio connection via the second interface 24 if the proximity information indicates spatial proximity of the vehicle key 200 to the vehicle control system 100.

The spatial proximity of the vehicle key 200 to the vehicle control system 100 could correspond, for example, to spatial proximity of the vehicle key to a transmitting unit of an interface of the vehicle control system 100, which transmitting unit is designed to communicate with the vehicle key. The spatial proximity could correspond, for example, to a physical presence of the vehicle key 200 inside a transmission radius around the transmitting unit of the vehicle control system 100, in which case a received signal strength of the transmitted signal from the transmitting unit at the vehicle key could be above a predefined threshold value for the signal strength, for example.

In at least some exemplary embodiments, a vehicle 1000 could comprise the vehicle control system 100. The spatial proximity of the vehicle key 200 to the vehicle control system 100 could correspond, for example, to a presence of the vehicle key 100 inside the vehicle 1000.

In at least some exemplary embodiments, a vehicle, for example, the vehicle 1000, may correspond, for example, to a land vehicle, a watercraft, an aircraft, a rail vehicle, a road vehicle, an automobile, an off-road vehicle, a motor vehicle or a heavy goods vehicle.

In at least some exemplary embodiments, the process of establishing the radio connection could comprise interchanging radio connection parameters. The control module 26 could also be designed to determine radio connection pairing for the radio connection. In some exemplary embodiments, the process of establishing the radio connection could comprise determining the radio connection pairing, for example.

In some exemplary embodiments, the radio connection parameters could comprise, for example, channel parameters, modulation parameters, frequency parameters, encryption parameters, pairing parameters and access parameters.

In some exemplary embodiments, the process of establishing the radio connection could comprise, for example, at least one element from the group of transmitting an enquiry, synchronization (or paging), setting up a connection (also link establishment), service discovery, exchanging encryption keys, entering a device identification in a white list and encrypting a connection. The control module 26 could also be designed to determine radio connection pairing for the radio connection. The process of determining the radio connection pairing could comprise, for example, interchanging encryption parameters and/or encryption information and storing radio connection parameters.

In at least some exemplary embodiments, the control module 26 could be designed to establish the radio connection to a mobile device 300. The mobile device 300 could correspond, for example, to a mobile telephone, a smartphone, a tablet computer, a mobile computer (also laptop), a personal digital assistant (PDA) and/or a remote control. The control module 26 could be designed, for example, to provide the mobile device 300 with vehicle state or key information via the radio connection. The vehicle state information could comprise, for example, at least one element from the group of tank level, range, mileage, rechargeable battery level and navigation information. The key information could comprise, for example, a closed state of the vehicle and/or a usage protocol for the vehicle key.

In some exemplary embodiments, the control module 26 could be designed to establish the radio connection to the vehicle control system 100. In at least some exemplary embodiments, the control module 26 could be designed to provide the vehicle control system 100 with key information via the radio connection, for example, for keyless entry and/or keyless go.

In some exemplary embodiments, the control module 26 could be designed to interchange information relating to a device identification. The information relating to the device identification could comprise, for example, device identification information relating to the vehicle key 200, device identification information relating to the mobile device 300 and/or device identification information relating to the vehicle control system 100. An item of device identification information relating to a device, for example, the device identification information relating to the mobile device 300, the vehicle control system 100 and/or the vehicle key 200, could comprise, for example, at least one element from the group of serial number of the device, network identifier of the device, media access control (MAC) address of the device, BLUETOOTH® address (BD_ADDR) of the device, encryption key of the device and/or of the radio connection, partial encryption key of the device and/or of the radio connection and allocated identification of the device.

In at least some exemplary embodiments, the information relating to the device identification could comprise encryption information. The control module 26 could also be designed to establish and/or encrypt the radio connection on the basis of the encryption information. The control module 26 could be designed, for example, to set up the radio connection on the basis of the encryption information by a Diffie-Hellman algorithm. The encryption could be based on AES encryption, for example. The encryption information could comprise, for example, at least one element from the group of encryption key, partial encryption key, symmetrical encryption key, long-term key, encryption parameter and encryption instruction.

In some exemplary embodiments, the control module 26 could also be designed to receive information relating to a connection trigger. The control module 26 could also be designed to establish the radio connection on the basis of the information relating to the connection trigger. The information relating to the connection trigger could be based, for example, on at least one element from the group of a pressed button, a combination of pressed buttons, a predefined movement profile (for example, by a motion/acceleration sensor) and a selection of a menu item in an information reproduction system.

Figure 6:
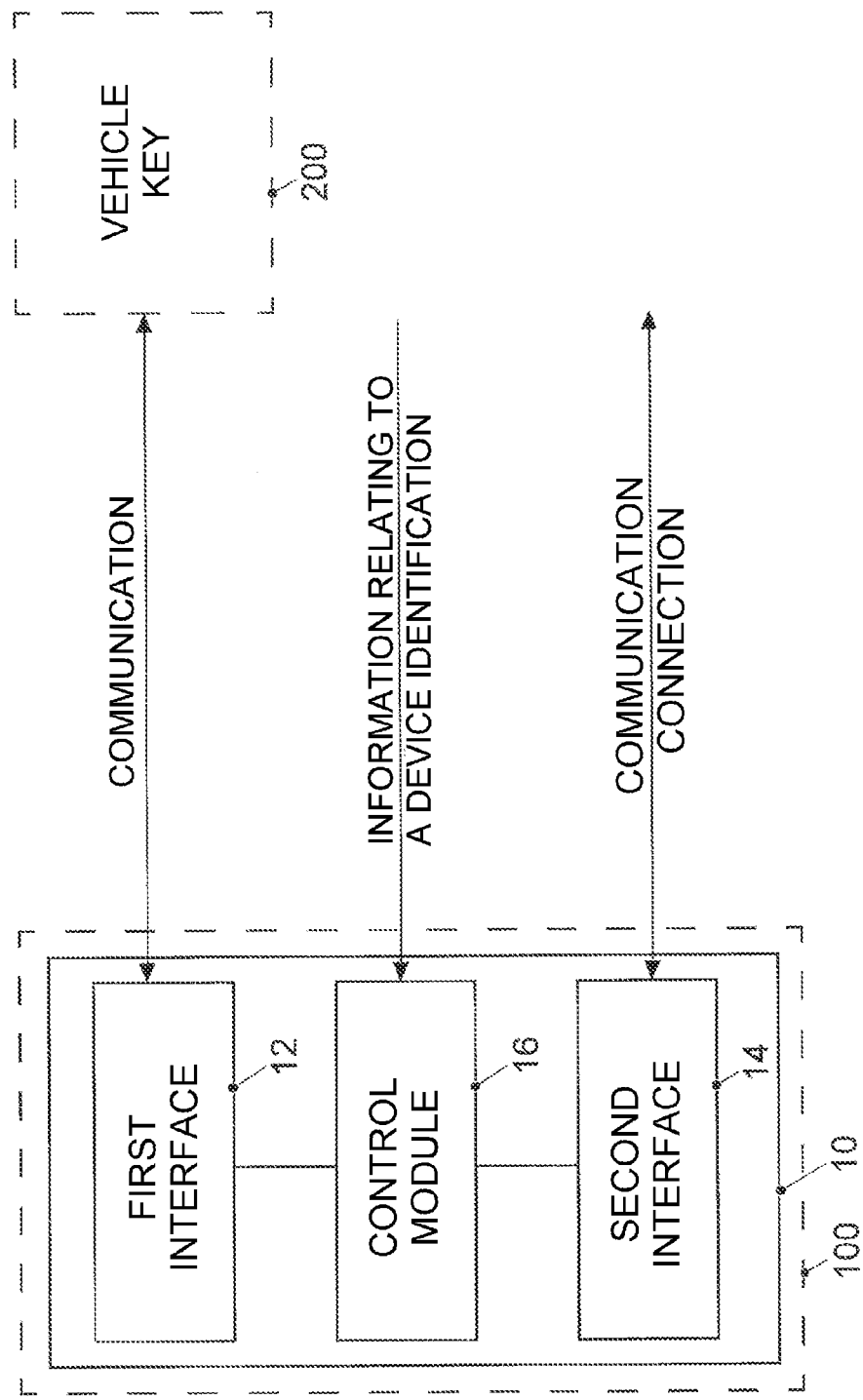
FIG. 6 illustrates a block diagram of an exemplary embodiment of an apparatus for a vehicle control system.

FIG. 6 illustrates a block diagram of an exemplary embodiment of an apparatus 10 for a vehicle control system 100. The apparatus 10 comprises a first interface 12 designed to communicate with a vehicle key 200.

In exemplary embodiments, the first interface 12 could correspond, for example, to an interface of an immobilizer. The first interface 12 could correspond, for example, to a unidirectional communication connection. Communication via the first interface 12 could be based, for example, on a computer chip which is excited, for example, via a magnetic field, for example, a radio-frequency identification chip (RFID). Communication with the vehicle key 200 could correspond, for example, to wireless or wired communication. In some exemplary embodiments, the first interface 12 could be designed to provide a magnetic field and/or modulate information onto a magnetic field. In some exemplary embodiments, the first interface could be based on low-frequency (LF) radio transmission, for example, in a 125 kHz band. In some exemplary embodiments, the first interface could comprise a plurality of transmitting and/or receiving modules, at least one transmitting and/or receiving module being designed to communicate via BLUETOOTH® OOB radio connections.

The apparatus 10 comprises a second interface 14 designed to communicate via a communication connection. The communication connection could correspond, for example, to a wired and/or wireless communication connection. In some exemplary embodiments, the communication connection could correspond, for example, to a radio connection, a short-distance connection, a short-range radio connection or a wired connection. The communication connection could also correspond to a virtual connection, for example, via a data stream in a communication network. The communication network could, for example, to a wireless communication network (for instance, a WLAN) or a wired communication network, for instance, a local area network (LAN), a control network (also Controller Area Network, CAN) and/or a local line network (also Local Interconnect Network, LIN).

The first interface 12 and/or the second interface 14 may correspond, for example, to one or more inputs and/or one or more outputs for receiving and/or transmitting information, for instance, in digital bit values, analog signals, magnetic fields, on the basis of a code, inside a module, between modules or between modules belonging to different entities.

The apparatus 10 also comprises a control module 16 designed to receive information relating to a device identification from the vehicle key 200 via the first interface 12 or the second interface 14. The control module 16 is coupled to the first interface 12 and to the second interface 14. The control module 16 could be designed, for example, to receive device identification information relating to the vehicle key 200 via the first interface 12, for instance, an immobilizer system, and/or via the second interface 14, for instance, BTLE. The control module 16 could be designed, for example, to receive device identification information relating to a mobile device from the vehicle key 200 via the first interface 12, for instance, an immobilizer system, and/or to receive the device identification information either directly from the mobile device 300 or via the vehicle key 200 via the second interface 14, for instance, BTLE.

The control module 16 is also designed to communicate via the second interface 14 on the basis of the information relating to the device identification. In at least some exemplary embodiments, communication could comprise interchanging radio connection parameters. In some exemplary embodiments, the control module 16 could be designed to communicate with devices via the second interface 14, the device identification of which is known and/or has been entered in a white list, for example.

In at least some exemplary embodiments, the information relating to the device identification could comprise encryption information. The control module 16 could also be designed to establish and/or encrypt the radio connection on the basis of the encryption information. The control module 16 could be designed, for example, to set up the radio connection on the basis of the encryption information by a Diffie-Hellman algorithm. The encryption could be based on AES encryption, for example.

In some exemplary embodiments, the control module 16 could be designed to determine proximity information on the basis of spatial proximity of the vehicle key 200 to the vehicle control system 100. The control module 16 could also be designed to provide the vehicle key 200 with the proximity information. In some exemplary embodiments, the control module 16 could be designed to cause generation of a magnetic field and/or to modulate the proximity information onto a magnetic field. In some exemplary embodiments, the control module 16 could be designed to cause an engine of the vehicle 1000 to be started, in which case a vibration of the vehicle corresponds to the proximity information. In some exemplary embodiments, the control module 16 could be designed to provide a radio signal, for instance, via the first interface 12 and/or the second interface 14, the proximity information being able to correspond to a reception strength of the radio signal or a visibility of the radio signal.

In some exemplary embodiments, the information relating to the device identification could comprise device identification information relating to the vehicle key 200. The control module 16 could be designed to establish the communication connection to the vehicle key 200 on the basis of the device identification information relating to the vehicle key 200. The control module 16 could also be designed to determine radio connection pairing for the radio connection between the vehicle key 200 and the vehicle control system 100.

In some exemplary embodiments, the information relating to the device identification could comprise device identification information relating to a mobile device 300. The control module 16 could be designed to establish the communication connection to the mobile device 300 on the basis of the device identification information relating to the mobile device 300. The control module 16 could also be designed to determine radio connection pairing for the radio connection between the vehicle control system 100 and the mobile device 300. In at least some exemplary embodiments, the control module 16 could be designed to receive the device identification information relating to the mobile device 300 from the vehicle key 200. In some exemplary embodiments, the control module 16 could be designed to establish the communication connection to the mobile device 300 via the vehicle key 200. In some exemplary embodiments, the control module 16 could be designed to establish device identification information relating to the vehicle control system 100 to the mobile device 300 via the vehicle key 200.

More details and characteristics of the apparatus 10 (for example, vehicle control system 100, vehicle key 200, mobile device 300, information relating to the device identification, proximity information, encryption information, radio connection) are mentioned in connection with the concept or examples which have been described above (for example, FIGS. 1 to 5). The apparatus 10 may comprise one or more additional optional features which correspond to one or more facets of the proposed concept or of the described examples, as have been described above or below.

In one exemplary implementation, the process of establishing a radio connection between the vehicle key 200 and the vehicle control system 100 could comprise the following operations, for example. If the learning process or pairing state of the vehicle control system 100 is activated (the control module 26 could be designed to check the pairing state, for example), the control module 26 could be designed to provide unaddressed advertising packets, which could comprise the BLUETOOTH® address or device identification for example, via the second interface 24. The term "advertising" is used below to describe the advertising of a service or a presence of a communication partner.

In this case, advertising packets may correspond, for example, to initialization packets which can be used to signal a connection readiness of a communication partner. The vehicle control system could now, for example, receive the device identification, for instance, via a first interface (for example, a first interface 12 from FIG. 6) which may be included, for example, in an OBU, for example, via a low-frequency or OOB connection. As a result of the use of the first interface, a presence of the vehicle key 200 in the vehicle 1000 could be checked, for example, and the vehicle key 200 could be allocated to the vehicle 1000. The control module 16 could be designed, for example, to provide the second interface 24 with the device identification of the vehicle key. The control module 16 could be designed to establish the radio connection via the second interface 24 on the basis of the device identification, for instance, to search for the vehicle key on the basis of the device identification of the vehicle key 200. If the second interface 16 receives the advertising packets of the vehicle key, the control module 16 could be designed to establish and/or encrypt the connection, for example, by a Diffie-Hellman key exchange, after which both sides may comprise symmetrical encryption information. The control module 16 could alternatively be designed to interchange the symmetrical encryption information (for instance, LTK) with the vehicle key 200 via the first interface 12 (for example, via BLUETOOTH® OOB or a low-frequency radio connection and/or by a control network (also Controller Area Network, CAN) and/or a local line network (also Local Interconnect Network, LIN)). The vehicle key 200 and/or the vehicle control system 100 could keep the encryption information for further communication, for example. The operations could be repeated, for example, to establish further radio connections.

In at least some exemplary embodiments, the vehicle control system 100 could be designed to (re)authorize all vehicle keys at once, for example, to increase security, for instance, in the event of immobilization of the vehicle, resale or replacement of the vehicle control system 100 in a workshop. The replaced vehicle control system could lose the ability to communicate with previously paired vehicle keys, for example.

Wired communication between an OBU and the vehicle control system 100 or inside modules of the vehicle control system 100 could be encrypted, for example. Exemplary embodiments could support confidentiality of the radio connection, for example.

In at least some exemplary embodiments, the vehicle key 200 could keep an item of symmetrical encryption information (for instance, the LTK) for the radio connection to the vehicle control system 100. The control module 16 could keep a plurality of items of symmetrical encryption information for the radio connections to two or more vehicle keys which are authorized for the vehicle 1000.

Figure 7:
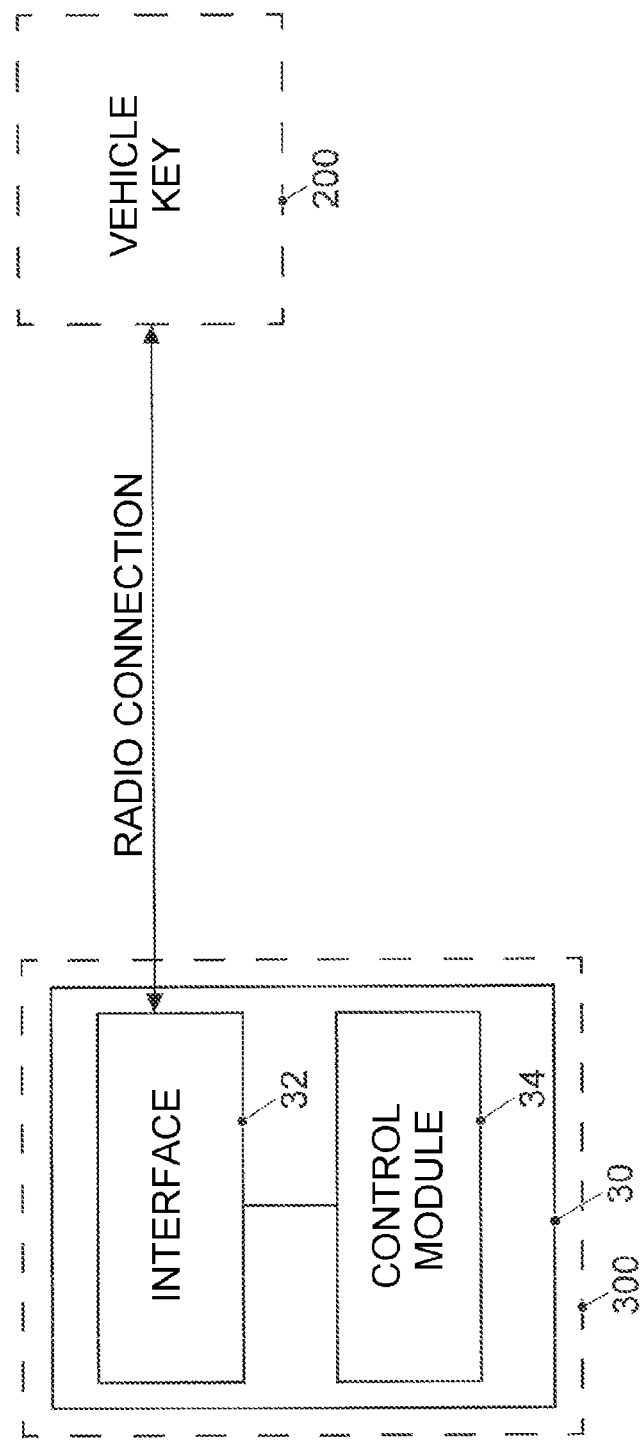
FIG. 7 illustrates a block diagram of an exemplary embodiment of an apparatus for a mobile device.

FIG. 7 illustrates a block diagram of an exemplary embodiment of an apparatus 30 for a mobile device 300. The apparatus 30 comprises an interface 32 designed to communicate via a radio connection.

The interface 32 may correspond, for example, to one or more inputs and/or one or more outputs for receiving and/or transmitting information, for instance, in digital bit values, on the basis of a code, inside a module, between modules or between modules belonging to different entities.

The apparatus 30 comprises a control module 34 designed to establish a radio connection to a vehicle key 200 via the interface 32. The control module 34 is also designed to determine radio connection pairing for the radio connection between the vehicle key 200 and the mobile device 300. The control module 34 is coupled to the interface 32.

In some exemplary embodiments, the control module 34 could also be designed to interchange information relating to a device identification with the vehicle key 200 via the radio connection. In some exemplary embodiments, the information relating to the device identification could comprise device identification information relating to a vehicle control system 100, device identification information relating to the vehicle key 200 and/or device identification information relating to the mobile device 300. The control module 34 could be designed to establish a further radio connection to a vehicle control system 100 on the basis of the information relating to the device identification.

In at least some exemplary embodiments, the information relating to the device identification could comprise encryption information. The control module 34 could also be designed to establish and/or encrypt the radio connection on the basis of the encryption information. The control module 34 could be designed, for example, to set up the radio connection on the basis of the encryption information by a Diffie-Hellman algorithm. The encryption could be based on AES encryption, for example.

In at least some exemplary embodiments, the process of establishing the radio connection could correspond to pairing. In some exemplary embodiments, the process of establishing the radio connection could comprise interchanging advertising packets and/or connection set-up packets.

In some exemplary embodiments, the radio connection could correspond to a BLUETOOTH® connection, a short-distance connection, a near-field communication connection, NFC, or a short-range radio connection.

More details and characteristics of the apparatus 30 (for example, vehicle control system 100, vehicle key 200, information relating to the device identification, encryption information, mobile device 300, radio connection, communication, establishing a radio connection) are mentioned in connection with the concept or examples which have been described above (for example, FIGS. 1 to 6). The apparatus 30 may comprise one or more additional optional features which correspond to one or more facets of the proposed concept or of the described examples, as have been described above or below.

Figure 8:
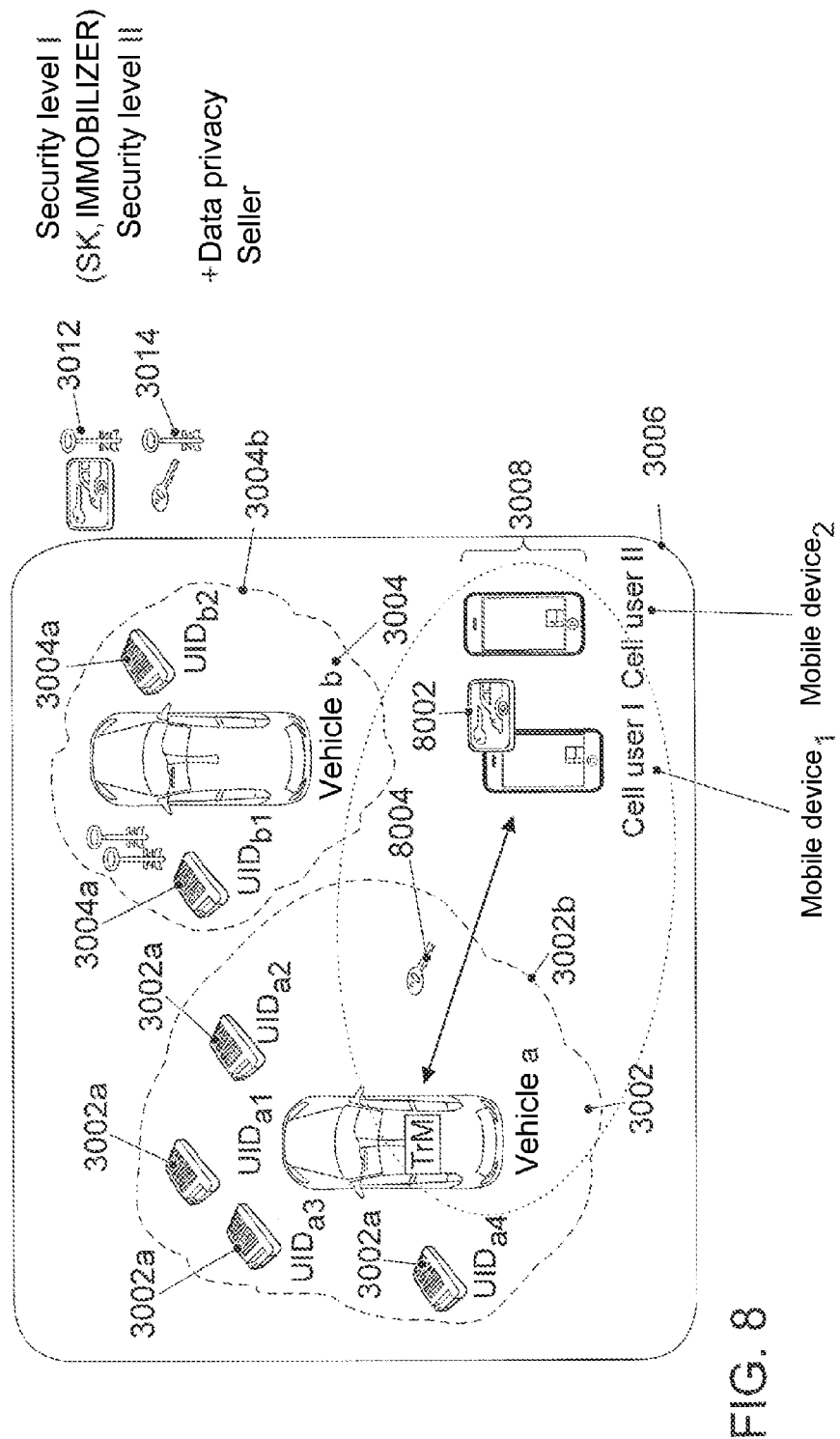
FIG. 8 shows a further overview of a vehicle security context of two vehicles.

FIG. 8 shows a further overview of an exemplary vehicle security context of two vehicles a 3002 and b 3004. Vehicle a 3002 comprises vehicle keys (UID) a1 to a4 3002a in its vehicle security context 3002b. Vehicle b 3004 comprises vehicle keys (UID) b1 and b2 3004a in its vehicle security context 3004b. The two vehicle security contexts 3002b and 3004b are included in an automotive context 3006. In addition to the elements from FIG. 3, FIG. 8 shows the two mobile devices 3008 within the automotive context 3006. In this exemplary embodiment, the two mobile devices have access to the vehicle within the first security level 3012, for example, on the basis of a secret key (SK) and/or an immobilizer, and have a protected connection to one or both of the vehicles within the second security level 3014, for example, on the basis of a long-term key (LTK) and/or on the basis of a short-range radio connection, for example, based on BLUETOOTH® Low Energy (BTLE or LE). In some exemplary embodiments, the secret key could be transmitted between communication partners via a secure communication connection.

Figure 9A:
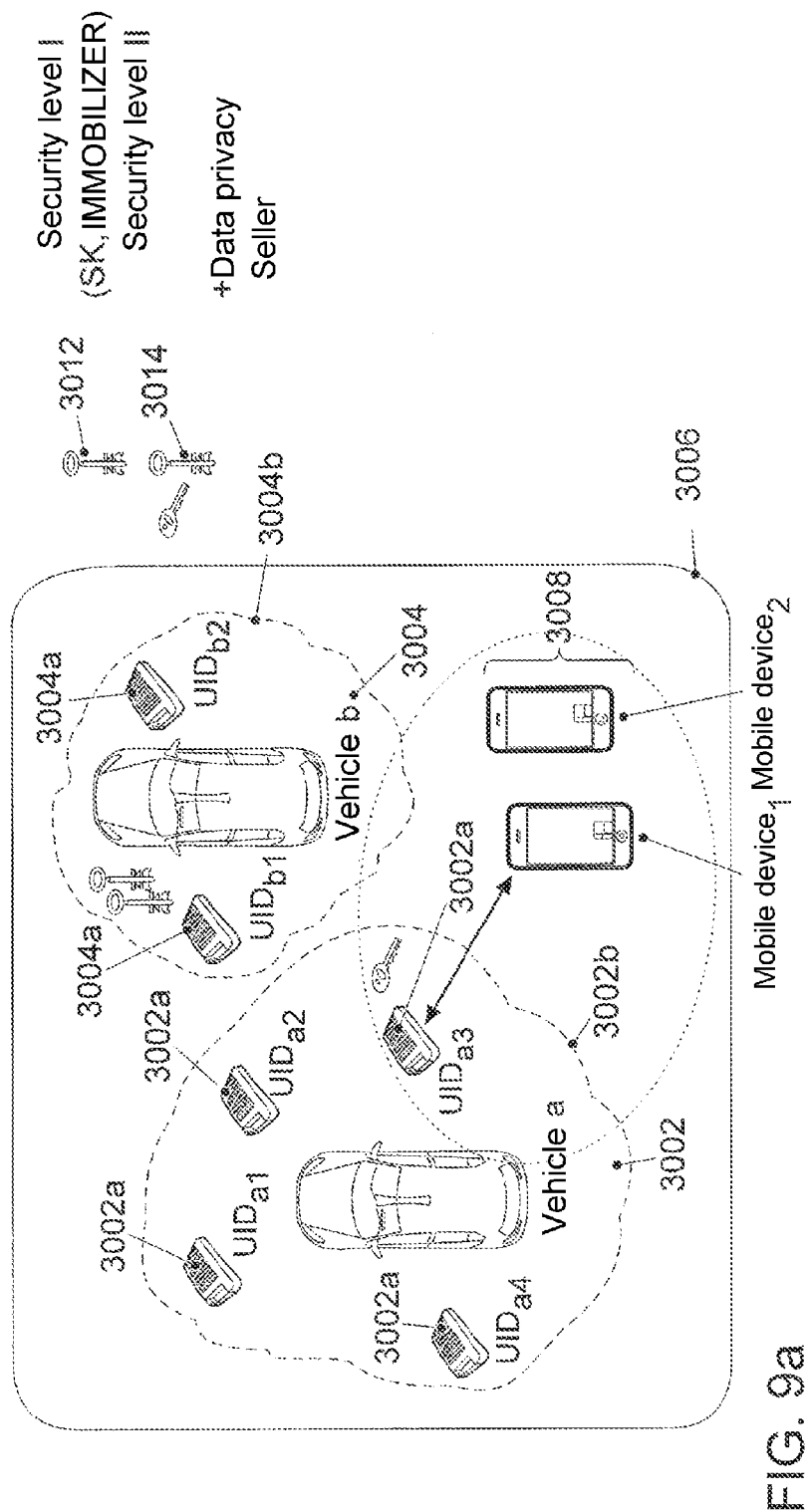
FIG. 9a shows a further overview of a vehicle security context of two vehicles.

FIG. 9a shows a further overview of an exemplary vehicle security context of two vehicles a 3002 and b 3004. Vehicle a 3002 comprises vehicle keys (UID) a1 to a4 3002a in its vehicle security context 3002b. Vehicle b 3004 comprises vehicle keys (UID) b1 and b2 3004a in its vehicle security context 3004b. The two vehicle security contexts 3002b and 3004b are included in an automotive context 3006. In addition to the elements from FIG. 3, FIG. 8 shows the two mobile devices 3008 within the automotive context 3006. The mobile devices 3008 have a protected connection to at least one vehicle key, for example, a vehicle key 3002a, within the second security level 3014, for example, on the basis of a long-term key (LTK) and/or on the basis of a short-range radio connection, for example, based on BLUETOOTH® Low Energy (BTLE or LE).

Figure 9B:
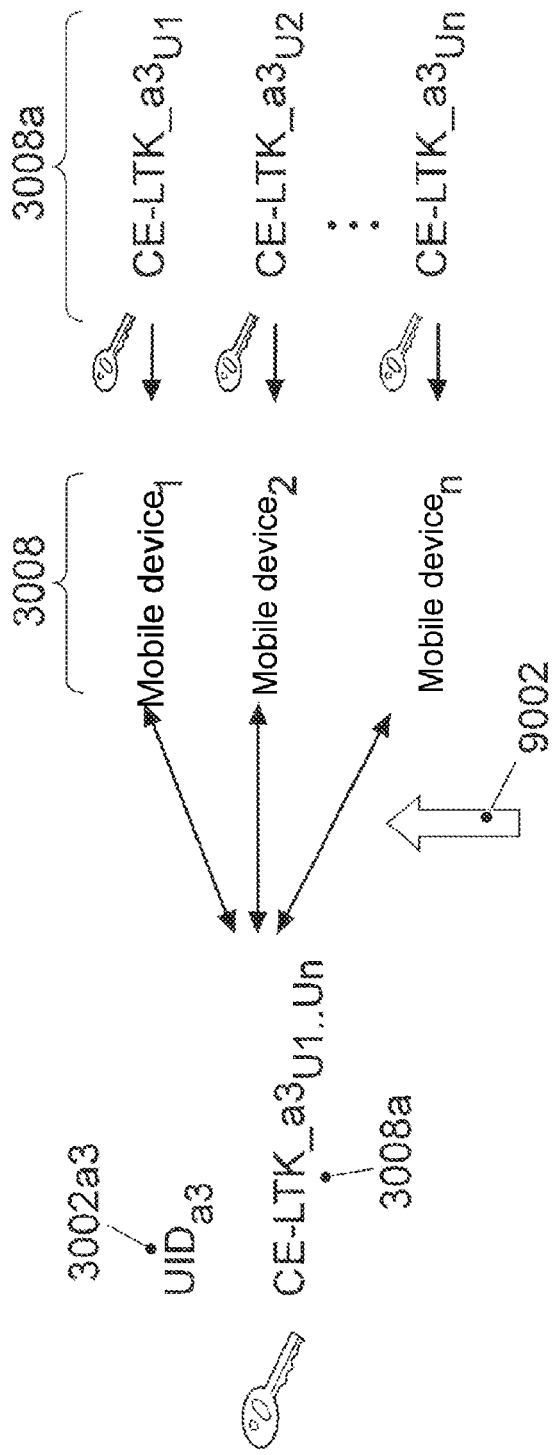
FIG. 9b shows an overview of a process of bonding a vehicle key to n mobile devices.

FIG. 9b shows an overview of a process of bonding 9002 a vehicle key (UID) 3002a3 to the n mobile devices 3008. The bonding 9002 could be based, for example, on n long-term keys CE-LTK (CEll phone Long Term Key) 3008a, in which case the long-term keys 3008a could correspond to symmetrical encryption keys, for example. The bonding could be carried out, for example, at any desired location, at any desired time and/or by any desired person in possession of the vehicle key 3002a3 and the vehicle 3002. In some exemplary embodiments, the vehicle key 3002a3 could be designed to communicate with the mobile devices 3008 using encryption. The vehicle key 3002a3 could be designed, for example, to provide a user with information relating to a pairing status of the vehicle key 3002a3, which information could comprise active pairings of the vehicle key 3002a3, for example. In exemplary embodiments, the vehicle key could be designed to delete existing pairings of the vehicle key, for instance, using one of the n mobile devices 3008, for example, without involving a server 4002 belonging to the vehicle manufacturer. In some exemplary embodiments, pairing of the vehicle key 3002a3 could be permitted only within a defined environment, for instance, inside the vehicle 3002.

In one exemplary embodiment, a user who has purchased a vehicle could couple his mobile device (for instance, the mobile device 300) to a vehicle key of the vehicle. For this purpose, he could install a mobile application on his mobile device, for example, and could add the vehicle in this mobile application. In this case, the mobile application could indicate, for example, that the vehicle key and a presence of the vehicle key in the vehicle could be a prerequisite for pairing the vehicle key (for instance, the vehicle key 200) with the mobile device. In some exemplary embodiments, the mobile device could also be paired with a vehicle control system (for instance, the vehicle control system 100) of the vehicle, and the vehicle control system could forward the pairings to the vehicle keys.

For pairing, the mobile device could listen for advertising packets from unknown sources via the interface 32, for example. These advertising packets could comprise identification data relating to the vehicle manufacturer, for example. To change the vehicle key to a pairing state, the user could press, for example, a predefined sequence of buttons of the vehicle key, for instance, to generate the information relating to the connection trigger, or the user could activate a pairing button in the vehicle (for instance, also inside an information reproduction system). For example, the vehicle key could also check a presence in the vehicle by starting the vehicle.

Alternatively or additionally, the vehicle control system could provide an item of proximity information, in which case an interrupt in the vehicle key could be triggered by the proximity information, for example, to confirm that the vehicle key is in the vehicle. Alternatively, the vehicle control system could establish a radio connection to the vehicle key and could check that the vehicle key is inside the vehicle. The vehicle key could maintain the pairing state for a predefined time, for example, 10 minutes. In the pairing state, the vehicle key could send an unaddressed advertising packet (for example, via the second interface 24) which the mobile device could receive and would then make a connection request, after which the vehicle key and the mobile device could be paired.

In some exemplary embodiments, the user could hold the vehicle key very close to the mobile device (for instance, could also touch) to ensure that the mobile device is paired with the correct key (if a further vehicle with a vehicle key in the pairing state is in the vicinity). Alternatively or additionally, the mobile application belonging to the users could request a predefined action to be carried out on the vehicle key in a temporally restricted manner as a prerequisite for pairing. After pairing, the mobile device could disconnect the connection and could search for further vehicle keys for pairing. To increase the security, pairing could be based on a Diffie-Hellman key exchange and/or could take place outside the public sphere. After pairing, the mobile application could indicate an overview of the pairings (for example, of the pairings of the mobile device and/or of the pairings of the vehicle key) to the user, for example, and could make it possible to remove the pairings.

In at least some exemplary embodiments, the pairing process could take place independently of a server belonging to the vehicle manufacturer. To increase the security, there could be an upper limit for simultaneous pairings of the vehicle key. A mobile device could be paired with more than one vehicle key, for example, and/or a vehicle key could be paired with a plurality of mobile devices. The encryption information could be stored, for example, on the mobile device, for example, using security measures of the mobile device manufacturer. In some exemplary embodiments, the pairing process could be initiated by the user of the vehicle.

In one exemplary implementation, the vehicle key 200 could be taught to the vehicle during manufacture at the vehicle manufacturer. In this case, it could be automatically ensured in exemplary embodiments that the vehicle control system 100 networked on the vehicle side and the portable vehicle key (UID) (or the portable UIDs) know one another. A plurality of vehicles could be close together in a manufacturing hall. Exemplary embodiments could avoid confusion with UIDs of an adjacent automobile. In exemplary embodiments, the term "know one another", or also "get to know" or "known" below, could be used to take into account, in a sufficiently precise manner, the two different stages which need to be taken into account or differentiated in this case:

Stage 1—"White List":

1a) the vehicle control system 100 could communicate its <BT device address (BD_ADDR)> (according to BLUETOOTH® specification vol. 6, 1.3) to the UID, and 1b) the UID could communicate its <BT device address> to the vehicle control system 100.

Strictly speaking, in more general terms, the BLUETOOTH® device address could be mutually known. A plurality of channels and times are conceivable in this case.

If the vehicle control system 100 has knowledge of the device address of the UID, the vehicle control system 100 can enter this address in its white list, with the result that, during advertising, only advertising packets from the associated (known) UIDs can be listened to in the vehicle control system 100.

In exemplary embodiments, the vehicle key could possibly transmit an addressed advertising packet to the vehicle control system 100. For this purpose, the device address of the advertiser or slave (that is to say of the UID) and the device address of the initiator or master (that is to say of the vehicle control system 100) could be placed in the advertising packets according to the specification (BT specification 2.3.1.2, volume 6).

As an alternative to addressed advertising packets, there is also the possibility of unaddressed advertising packets, in the case of which a communication partner concomitantly writes his own address into the advertising packet.

Stage 2—"Pairing"

There are various methods for pairing; for example, BT-based associated secret keys could be stipulated on both sides, with the result that encrypted communication is then also possible within BTLE. If the devices mutually know their device addresses, this can then take place at any time in a "familiarization process".

As described in stage 1, exemplary embodiments could ensure that the device address of the interlocutors is mutually known. In some exemplary embodiments, the UID (for instance, the vehicle key 200) could transmit its device identification to the vehicle or the vehicle control system 100. This device identification could correspond, for example, to the BT device address which could be numbered consecutively and could be unique. The device identification or the BT device address could not be secret, for example, and could be forwarded to the vehicle control system 100 via a bus system. The device identification could be transmitted, for example, via the first interfaces 22/12, as a result of which it could be confirmed in some exemplary embodiments that this device identification comes from a UID which is inside the respective vehicle.

The UID could then send an unaddressed advertising packet (see above) and the vehicle control system 100 could listen for the device address of the vehicle key 200 (UIDs in neighboring vehicles could be ignored on the basis of the OOB-manipulated white list). The vehicle control system 100 could set up a connection and could send its own device address to the vehicle key 200. As a result, the UID could now be able to also send addressed advertising packets from now on. Optionally, the device address could be used, in another bit sequence which is transmitted from the vehicle control system 100 to the vehicle key 200 (OOB), to spoof the device address of the vehicle control system 100 (for example, possibly in a wake-up packet); an addressed advertising packet would then be directly possible.

In some exemplary embodiments, communication between the UID and the vehicle control system 100 could be encrypted; encryption pairing could then be carried out, for example. Since the device address is mutually known, this could be carried out independently of the first interface 22/12.

Figure 10:
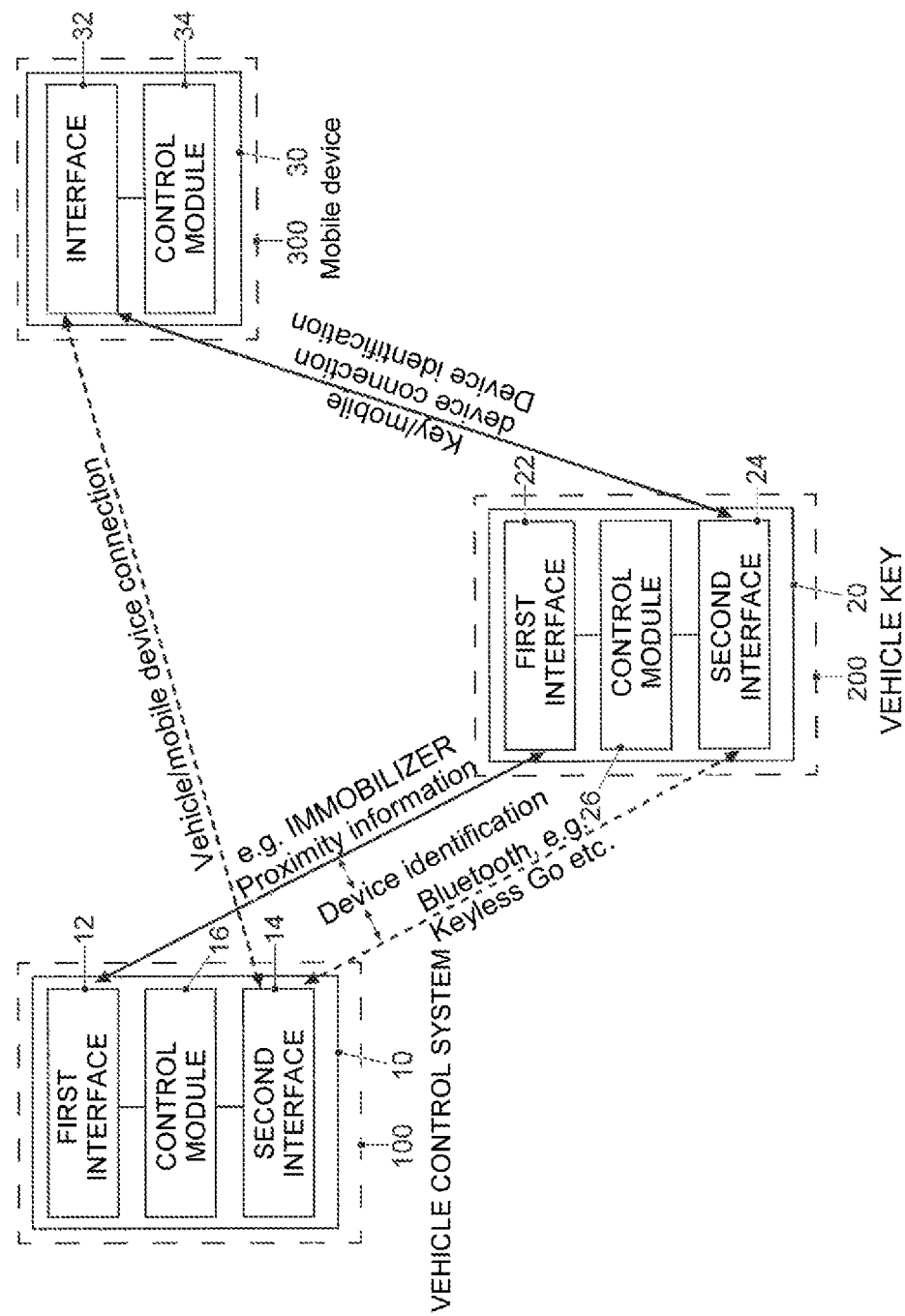
FIG. 10 shows an exemplary relationship of the components: vehicle control system, vehicle key and mobile device.

FIG. 10 shows an exemplary relationship of the components: vehicle control system 100, vehicle key 200 and mobile device 300. The vehicle control system 100 comprises the apparatus 10 which comprises the first interface 12, the second interface 14 and the control module 16. The control module 16 is coupled to the first interface 12 and to the second interface 14. The vehicle key 200 comprises the apparatus 20 which comprises the first interface 22, the second interface 24 and the control module 26. The control module 26 is coupled to the first interface 22 and to the second interface 24. The mobile device 300 comprises the apparatus 30 which comprises the interface 32 and the control module 34 which is coupled to the interface 32.

In at least some exemplary embodiments, the vehicle control system 100 is designed to provide the first interface 22 of the vehicle key 200 with proximity information via the first interface 12. The control module 16 can be designed, for example, to set up a radio connection, for example, via BLUETOOTH®, between the second interface 14 and the second interface 24 of the vehicle key 200, for example, for keyless entry and/or keyless go systems. The vehicle control system 100 is designed to receive device identification information relating to the vehicle key 200 and/or device identification information relating to the mobile device 300 via the first interface 12 and/or via the second interface 14 to establish the radio connection to the vehicle key 200 and/or to the mobile device 300. In this case, the vehicle key 100 may be designed to receive the device identification information relating to the mobile device 300 from the vehicle key 200. Encryption information can also be transmitted via the radio and communication connections to encrypt the communication connections. The control module 26 of the vehicle key 26 may be designed, for example, to establish radio connections to the vehicle control system 100 and/or to the mobile device 300, for example, on the basis of the device identification information relating to the vehicle control system 100 or the device identification information relating to the mobile device 300 which could be received by the vehicle key via the first interface 22 and/or the second interface 24. The control module 34 may be designed to establish a radio connection to the vehicle key 200, for example, on the basis of the device identification information relating to the vehicle key. The control module 34 may also be designed to establish a further radio connection to the vehicle control system 100, for example, on the basis of the device identification information relating to the vehicle control system 100. The device identification information relating to the vehicle control system 100 could be received by the control module 34 from the vehicle key 200, for example.

Figure 11:
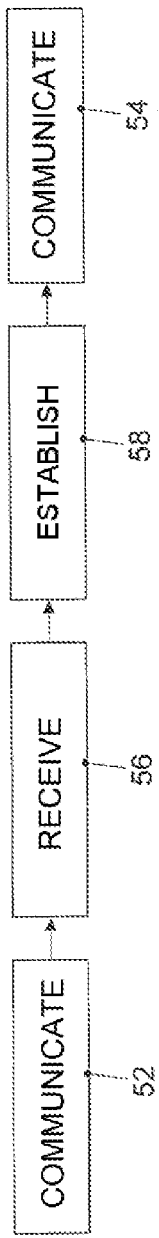
FIG. 11 shows a flowchart of a method for a vehicle key.

FIG. 11 shows a flowchart of a method for a vehicle key 200. The method comprises communicating 52 with a vehicle control system 100 via a first interface 22. The method also comprises communicating 54 via a radio connection via a second interface 24. The method also comprises receiving 56 proximity information from the vehicle control system 100. The method also comprises establishing 58 a radio connection via the second interface 24 if the proximity information indicates spatial proximity of the vehicle key 200 to the vehicle control system 100.

Figure 12:
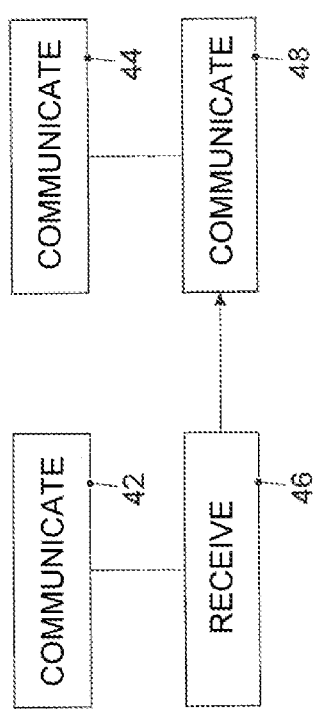
FIG. 12 shows a flowchart of a method for a vehicle control system.

FIG. 12 shows a flowchart of a method for a vehicle control system 100. The method comprises communicating 42 with a vehicle key 200 via a first interface 12. The method also comprises communicating 44 via a communication connection via a second interface 14. The method also comprises receiving 46 information relating to a device identification from the vehicle key 200 via the first interface 12 or the second interface 14. The method also comprises communicating 48 via the second interface 14 on the basis of the information relating to the device identification.

Figure 13:
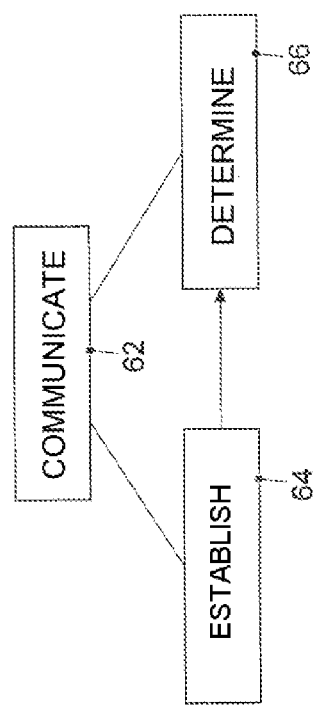
FIG. 13 shows a flowchart of a method for a mobile device.

FIG. 13 shows a flowchart of a method for a mobile device 300. The method comprises communicating 62 via a radio connection. The method also comprises establishing 64 a radio connection to a vehicle key 200. The method also comprises determining 66 radio connection pairing for the radio connection between the vehicle key 200 and the mobile device 300.

Another exemplary embodiment is a computer program for carrying out at least one of the methods described above if the computer program runs on a computer, a processor or a programmable hardware component. Another exemplary embodiment is also a digital storage medium which is machine-readable or computer-readable and has electronically readable control signals which can interact with a programmable hardware component in such a manner that one of the methods described above is carried out.

The various configurations of the features disclosed in the description above, the claims below and the enclosed figures may be important and may be implemented both individually and in any desired combination for implementing an exemplary embodiment.

Although some facets have been described in connection with an apparatus, it goes without saying that these facets are also a description of the corresponding method, with the result that a block or a component of an apparatus can also be understood as meaning a corresponding method operation or a feature of a method operation. Similarly, facets which have been described in connection with a method operation or as a method operation are also a description of a corresponding block or detail or feature of a corresponding apparatus.

Depending on implementation requirements, exemplary embodiments can be implemented in hardware or software. Implementation can be carried out using a digital storage medium, for example, a floppy disk, a DVD, a Blu-ray disc, a CD, a ROM, a PROM, an EPROM, an EEPROM or a flash memory, a hard disk or another magnetic or optical memory which stores electronically readable control signals which interact or can interact with a programmable hardware component in such a manner that the respective method is carried out.

A programmable hardware component may be formed by a processor, a computer processor (CPU=Central Processing Unit), a graphics processor (GPU=Graphics Processing Unit), a computer, a computer system, an application-specific integrated circuit (ASIC), an integrated circuit (IC), a system-on-chip (SOC), a programmable logic element or a field-programmable gate array (FPGA) with a microprocessor.

The digital storage medium may therefore be machine-readable or computer-readable. Some exemplary embodiments therefore comprise a data storage medium having electronically readable control signals which are able to interact with a programmable computer system or a programmable hardware component in such a manner that one of the methods described herein is carried out. An exemplary embodiment is therefore a data storage medium (or a digital storage medium or a computer-readable medium) on which the program for carrying out one of the methods described herein is recorded.

Exemplary embodiments can generally be implemented as a program, firmware, a computer program or a computer program product having a program code or as data, the program code or the data being effective to the effect that one of the methods is carried out if the program runs on a processor or a programmable hardware component. The program code or the data may also be stored, for example, on a machine-readable carrier or data storage medium. The program code or the data may be source code, machine code or byte code and another intermediate code, inter alia.

Another exemplary embodiment is also a data stream, a signal sequence or a sequence of signals which constitutes the program for carrying out one of the methods described herein. The data stream, the signal sequence or the sequence of signals may be configured, for example, to be transferred via a data communication connection, for example, via the Internet or another network. Exemplary embodiments are therefore also signal sequences which represent data and are suitable for transmission via a network or a data communication connection, the data constituting the program.

A program according to at least one exemplary embodiment may implement one of the methods during the performance thereof, for example, by virtue of the program reading memory locations or writing a data item or a plurality of data items to the memory locations, thus possibly causing switching operations or other operations in transistor structures, in amplifier structures or in other electrical, optical or magnetic components or components operating according to another functional principle. Accordingly, data, values, sensor values or other information can be acquired, determined or measured by a program by reading a memory location. A program can therefore capture, determine or measure variables, values, measurement variables and other information by reading one or more memory locations and can cause, initiate or carry out an action and can control other devices, machines and components by writing to one or more memory locations.

The exemplary embodiments described above are only an illustration of the principles of the present disclosure. It goes without saying that modifications and variations of the arrangements and details described herein will be clear to other experts. Therefore, the intention is to restrict the disclosure only by the scope of protection of the patent claims below and not by the specific details which have been presented herein on the basis of the description and the explanation of the exemplary embodiments.

LIST OF REFERENCE SYMBOLS

10 Apparatus
12 First interface
14 Second interface
16 Control module
20 Apparatus
22 First interface
24 Second interface
26 Control module
30 Apparatus
32 Interface
34 Control module
42 Communicate
44 Communicate
46 Receive
48 Communicate
52 Communicate
54 Communicate
56 Receive
58 Establish
62 Communicate
64 Establish
66 Determine
100 Vehicle control system
200 Vehicle key
300 Mobile device
1000 Vehicle
2000 Vehicle
2002 Conventional vehicle security context
2002a Vehicle key
2004 Extended vehicle security context
2004a Vehicle key
2004b Mobile device
2004c Base station
2006 Extended security concept
2006a Vehicle key
2006b Mobile device
2006c Base station
2006d Server module
2006e Further base station
2008 Smartwatch
3002 Vehicle a
3002a Vehicle key
3002a2 Vehicle key
3002a3 Vehicle key
3002b Vehicle security context
3004 Vehicle b
3004a Vehicle key
3004b Vehicle security context
3006 Automotive context
3008 Mobile devices
3010 Mobile devices
3012 First security level
3014 Second security level
4002 Server
4004 Immobilizer system
5002 Vehicle key
5004 TrM
5006 Server
9002 Bonding

The invention claimed is:

1. An apparatus for a vehicle key, the apparatus comprising:
   a first interface to communicate with a vehicle control system;
   a second interface to communicate via a radio connection; and
   a control module to:
      receive proximity information from the vehicle control system via the first interface, and
      establish a radio connection via the second interface in response to a determination that the proximity information indicates spatial proximity of the vehicle key to the vehicle control system,
   wherein a vehicle comprises the vehicle control system, and wherein the spatial proximity of the vehicle key to the vehicle control system corresponds to a presence of the vehicle key inside the vehicle, and
   wherein the vehicle performs a learning operation inside of the vehicle to register a mobile device inside the vehicle in response to a determination that the vehicle key is inside the vehicle.

2. The apparatus of claim 1, wherein the process of establishing the radio connection comprises interchanging radio connection parameters, and wherein the control module also determines radio connection pairing for the radio connection.

3. The apparatus of claim 1, wherein the control module establishes the radio connection to a mobile device,
   and/or wherein the control module establishes the radio connection to the vehicle control system.

4. The apparatus of claim 3, wherein the control module interchanges information relating to a device identification, and wherein the information relating to the device identification comprises device identification information relating to the vehicle key, device identification information relating to the mobile device and/or device identification information relating to the vehicle control system.

5. The apparatus of claim 4, wherein the information relating to the device identification comprises encryption information, and wherein the control module also establishes and/or encrypts the radio connection based on the encryption information.

6. The apparatus of claim 1, wherein the control module also receives information relating to a connection trigger, and wherein the control module also establishes the radio connection based on the information relating to the connection trigger,
and/or wherein the radio connection corresponds to a BLUETOOTH® connection, a short-distance connection, a near-field communication connection, NFC, or a short-range radio connection.

7. An apparatus for a vehicle control system, the apparatus comprising:
a first interface to communicate with a vehicle key;
a second interface to communicate via a communication connection; and
a control module to:
receive information relating to a device identification from the vehicle key via the first interface or the second interface,
communicate via the second interface based on the information relating to the device identification, and
perform a learning operation inside a vehicle to register a mobile device with the vehicle key in response to a determination that the vehicle key is inside the vehicle.

8. The apparatus of claim 7, wherein the control module determines proximity information based on spatial proximity of the vehicle key to the vehicle control system, and wherein the control module also provides the vehicle key with the proximity information.

9. The apparatus of claim 7, wherein the information relating to the device identification comprises device identification information relating to the vehicle key, and wherein the control module establishes the communication connection to the vehicle key based on the device identification information relating to the vehicle key, and/or
wherein the information relating to the device identification comprises device identification information relating to a mobile device, and
wherein the control module establishes the communication connection to the mobile device based on the device identification information relating to the mobile device.

10. The apparatus of claim 7, wherein the information relating to the device identification comprises encryption information, and wherein the control module also establishes and/or encrypts the communication connection based on the encryption information.

11. The apparatus of claim 7, wherein the communication connection corresponds to a radio connection, a short-distance connection, a short-range radio connection or a wired connection.

12. An apparatus for a mobile device, the apparatus comprising:
an interface to communicate via a radio connection; and
a control module to:
establish a radio connection to a vehicle key via the interface,
determine radio connection pairing for the radio connection between the vehicle key and the mobile device, and
perform a learning operation inside a vehicle to register the mobile device with the vehicle key in response to a determination that the vehicle key is inside the vehicle.

13. The apparatus of claim 12, wherein the control module also interchanges information relating to a device identification with the vehicle key via the radio connection.

14. The apparatus of claim 13, wherein the information relating to the device identification comprises device identification information relating to a vehicle control system, device identification information relating to the vehicle key and/or device identification information relating to the mobile device, and/or wherein the control module establishes a further radio connection to a vehicle control system based on the information relating to the device identification.

15. The apparatus of claim 13, wherein the information relating to the device identification comprises encryption information, and wherein the control module also establishes and/or encrypts the radio connection and/or the further radio connection based on the encryption information, and/or wherein the radio connection corresponds to a BLUETOOTH® connection, a short-distance connection, a near-field communication connection, NFC, or a short-range radio connection.

16. The apparatus of claim 12, wherein a presence of the vehicle key in a vehicle, to which the vehicle key is assigned, is presupposed for pairing the vehicle key to the mobile device.

* * * * *